(12) United States Patent
Fresen et al.

(10) Patent No.: US 12,664,356 B2
(45) Date of Patent: Jun. 23, 2026

(54) HYBRID SPREADSHEET AND CODING ENVIRONMENT SUPPORTING MULTIPLE PROGRAMMING LANGUAGES

(71) Applicant: Row Zero, Inc., Seattle, WA (US)

(72) Inventors: Grant B. Fresen, Seattle, WA (US); Nicholas End, Seattle, WA (US); Thomas Slatton, Seattle, WA (US); William Littlefield, San Francisco, CA (US)

(73) Assignee: Row Zero, Inc., Seattle, WA (US)

( * ) Notice: Subject to any disclaimer, the term of this patent is extended or adjusted under 35 U.S.C. 154(b) by 206 days.

(21) Appl. No.: 18/482,572

(22) Filed: Oct. 6, 2023

(65) Prior Publication Data

US 2024/0119229 A1 Apr. 11, 2024

Related U.S. Application Data

(60) Provisional application No. 63/378,694, filed on Oct. 7, 2022.

(51) Int. Cl.
| | |
|---|---|
| *G06F 40/18* | (2020.01) |
| *G06F 3/0482* | (2013.01) |
| *G06F 3/0484* | (2022.01) |
| *G06F 8/30* | (2018.01) |
| *G06F 8/33* | (2018.01) |
(Continued)

(52) U.S. Cl.
CPC ............ *G06F 40/18* (2020.01); *G06F 3/0482* (2013.01); *G06F 3/0484* (2013.01); *G06F 8/30* (2013.01); *G06F 8/33* (2013.01); *G06F 40/12* (2020.01); *H04L 43/0852* (2013.01); *H04L 67/101* (2013.01)

(58) Field of Classification Search
CPC ...... G06F 40/18; G06F 3/0482; G06F 3/0484; G06F 8/30; G06F 8/311; G06F 40/12; G06F 8/33; G06F 8/34; H04L 43/0852; H04L 67/101
See application file for complete search history.

(56) References Cited

U.S. PATENT DOCUMENTS

| | | |
|---|---|---|
| 9,582,288 B1 | 2/2017 | Stewart |
| 10,887,276 B1 | 1/2021 | Parulkar et al. |

(Continued)

OTHER PUBLICATIONS

GitHub, Quadratic/docs/how quadratic works, accessed at https://github.com/quadratichq/quadratic/blob/main/docs/how_quadratic_works.md on May 15, 2022.

(Continued)

*Primary Examiner* — Nicholas Ulrich
(74) *Attorney, Agent, or Firm* — Fox Rothschild LLP

(57) ABSTRACT

A method of implementing a spreadsheet includes, by a processor of a computing device, executing programming instructions that cause the computing device to output a prompt that comprises a plurality of candidate programming languages. When the system receives, in response to the prompt, a user selection of one of the candidate programming languages, it will display a user interface comprising a first interface area that displays one or more sheets of a spreadsheet. Each of the sheets comprises a plurality of cells, at least some of which comprise code in the spreadsheet formula language that references functions or data in the selected programming language.

24 Claims, 11 Drawing Sheets

(51) Int. Cl.
    *G06F 40/12*      (2020.01)
    *H04L 43/0852*   (2022.01)
    *H04L 67/101*    (2022.01)

(56) References Cited

U.S. PATENT DOCUMENTS

| | | | |
|---|---|---|---|
| 2007/0233811 A1 | 10/2007 | Rochelle et al. | |
| 2012/0110001 A1* | 5/2012 | Young | G06F 40/18 |
| | | | 707/769 |
| 2012/0110428 A1* | 5/2012 | Meijer | G06F 9/46 |
| | | | 715/219 |
| 2012/0167042 A1* | 6/2012 | Tillmann | G06F 8/33 |
| | | | 717/113 |
| 2014/0258374 A1 | 9/2014 | Suryanarayanan et al. | |
| 2015/0378980 A1* | 12/2015 | Cuomo | G06F 16/2237 |
| | | | 715/219 |
| 2016/0055140 A1 | 2/2016 | McKenzie et al. | |
| 2016/0103706 A1 | 4/2016 | Novaes | |
| 2016/0291942 A1 | 10/2016 | Hutchison | |
| 2018/0285084 A1* | 10/2018 | Mimlitch, III | G06F 11/3604 |
| 2019/0370322 A1 | 12/2019 | Miller, III | |
| 2020/0042588 A1 | 2/2020 | Sagalovskiy et al. | |
| 2020/0285694 A1* | 9/2020 | Nield | G06F 9/45504 |
| 2021/0357241 A1* | 11/2021 | Srinivasan | G06F 40/205 |
| 2022/0023755 A1 | 1/2022 | Vukojevic et al. | |
| 2022/0035661 A1 | 2/2022 | Bahrami et al. | |
| 2024/0070383 A1* | 2/2024 | Patel | G06F 40/18 |

OTHER PUBLICATIONS

Project Jupyter, Free software, open standards, and web services for interactive computing across all programming languages, accessed at https://jupyter.org on Sep. 14, 2022.

Microsoft Community, Formulas breaking in different languages, accessed at https://answers.microsoft.com/en-us/msoffice/forum/all/formulas-breaking-in-different-languages/a821c5dc-b288-4986-96bd-5b1a3218a72b on May 16, 2022.

International Search Report and Written Opinion for PCT/US2023/76249 dated Mar. 21, 2024, 18 pages.

* cited by examiner

202 — Display first interface area for one or more sheets of a spreadsheet

204 — Display second interface area comprising a code window

206 — Receive order of execution

208 — Execute functions of spreadsheet cells and programming instructions of the blocks in the selected order of execution 210 — Update interface area(s)

602 — Display user interface

604 — Identify remote server that contains active instance

606 — Receive values from remote server

608 — Display values from the remote server in cells

702 — Display user interface

704 — Remote or local operation mode?

local remote

706 — Identify remote server that contains active instance

708 — Receive values from remote server

710 — Display values from the remote server in cells

712 — Locally execute function(s) to generate value(s)

714 — Display values from local execution

Python Example

C# Example

| =SUM(A0:A4) | | |
|---|---|---|
| | A | B |
| 0 | 1 | =SUM(A0:A4)| |
| 1 | 2 | |
| 2 | 3 | |
| 3 | 4 | |
| 4 | 5 | |

FIG. 10

HYBRID SPREADSHEET AND CODING ENVIRONMENT SUPPORTING MULTIPLE PROGRAMMING LANGUAGES

RELATED APPLICATIONS AND CLAIM OF PRIORITY

This patent document claims priority to U.S. Provisional Patent Application No. 63/378,694, filed Oct. 7, 2022. The disclosure of the priority application is fully incorporated into this document by reference.

BACKGROUND

In conventional coding environments, programming instructions, also called code, in a file is executed from top to bottom. This convention allows software engineers to anticipate how the code executes, and reordering the code can change its execution flow. Meanwhile, conventional spreadsheet applications do not have a particular location or cell designated as the starting point for execution. Instead, the order of execution is dependent on the functions and values entered in each cell.

Some applications include a coding environment and a spreadsheet application in a single combined application, e.g., one that has both code and data in spreadsheet cells. In such applications, the code and spreadsheet cell data may be codependent, in that the code executes using input from the spreadsheet, or a function in the spreadsheet is defined in the coding environment. Without specific input from a user, the order in which a combined program executes is not well-defined. The order is also not well-defined when a program has multiple spreadsheets and multiple coding windows, which can lead to programs that are difficult for software engineers to interpret, or which may not execute as they anticipated.

SUMMARY

Disclosed are methods for implementing a hybrid computing environment having both a coding environment and a spreadsheet application, while also including an execution user interface that allows a user to set the order of execution of the code within the coding environment and the cells within the spreadsheet application. Including the execution user interface in the hybrid computing environment allows a user to specify the order of execution of the code and spreadsheet data, thus overcoming the challenge and uncertainty of execution order associated with hybrid computing environments.

In a first aspect, a method of implementing a spreadsheet includes displaying a user interface comprising a first interface area for displaying one or more sheets of a spreadsheet containing multiple sheets. Each of the sheets comprises a plurality of cells. Each of the cells is fillable with data. The user interface also includes a second interface area comprising a coding window with information corresponding to =one or more blocks of programming instructions. The programming instructions, when executed, will cause a computing device to update one or more of the variables used in at least some of the cells. The method also includes receiving, via the user interface, a selected order of execution for each of the sheets and blocks. The method includes executing the functions of the cells of each of the sheets and the programming instructions of the blocks in the selected order of execution to update values of cells displayed one or more of the sheets, as well as updating the first interface area to include the updated values.

In a second aspect, a processor of a computing device implements a spreadsheet application by displaying a user interface comprising a spreadsheet containing a plurality of cells, wherein the user interface comprises a first interface area for displaying one or more sheets of a spreadsheet containing multiple sheets. Each of the sheets comprises a plurality of cells, and each of the cells is fillable with data. The user interface also comprises a second interface area comprising one or more coding windows with information corresponding to one or more blocks of programming instructions. The programming instructions, when executed by a processor, will cause the computing device processor to update one or more of the variables used in at least some of the cells. The user interface receives a selected order of execution for each of the sheets and blocks. The processor then identifies a remote server via which an active instance of the spreadsheet is available, and it transmits the selected order of execution to the remote server. The computing device receives, from the remote server via which an active instance of the spreadsheet is available, for each of the plurality of cells, a corresponding value to display in that cell. The value resulted from executing the functions of the cells and the programming instructions of the blocks in the selected order of execution. The computing device display, in each of the plurality of cells, the corresponding value as received from the remote server without the computing device performing any function to calculate the corresponding value.

In another aspect, a method includes, by a processor of a local computing device, executing programming instructions that cause the local computing device to implement a spreadsheet application by: (i) displaying a user interface comprising a spreadsheet containing a plurality of cells; (ii) identifying a remote server that contains an active instance of the spreadsheet; (iii) receiving, from the remote server for each of the plurality of cells, a corresponding value to display in that cell; and (iv) displaying, in each of the plurality of cells, the corresponding value as received from the remote server without the computing device performing any function to calculate the corresponding value. In some embodiments, to identify the remote server the system may identify a plurality of data centers that each contain or provide a gateway to at least one active instance of the spreadsheet, send a message to each of the data centers, receive responses to the message from at least some of the data centers, Based on the responses, the system may measure message latency between the data centers from which responses were received and the computing device. The system may select the data center having a lowest message latency as the remote server.

In another aspect, a processor of a computing device executes programming instructions that cause the computing device to display a user interface comprising a spreadsheet containing a plurality of cells. The device receives, from a user via the user interface, a selection of a remote operation mode or a local operation mode. If the selection is for the remote operation mode, the device will receive, from a remote server for each of the plurality of cells, a corresponding value to display in that cell, and the device will display, in each of the plurality of cells, the corresponding value as received from the remote server without performing any function on the computing device to calculate the corresponding value. Otherwise, for at least some of the plurality of cells, the device will execute a function to generate a corresponding value for those cells, and the device will display, in each of those cells, the corresponding value for that cell.

In another aspect, a method of implementing a spreadsheet includes, by a processor of a computing device, executing programming instructions that cause the computing device to output a prompt that comprises a plurality of candidate programming languages. When the system receives, in response to the prompt, a user selection of one of the candidate programming languages, it will display a user interface comprising a first interface area that displays one or more sheets of a spreadsheet. Each of the sheets comprises a plurality of cells, at least some of which comprise code in the selected programming language.

BRIEF DESCRIPTION OF THE DRAWINGS

FIG. 10 illustrates an example process that extends a programming language with spreadsheet syntax.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" (or "comprises") means "including (or includes), but not limited to." When used in this document, the term "exemplary" is intended to mean "by way of example" and is not intended to indicate that a particular exemplary item is preferred or required.

In this document, when terms such as "first" and "second" are used to modify a noun, such use is simply intended to distinguish one item from another; it is not intended to require a sequential order unless specifically stated. The term "approximately," when used in connection with a numeric value, is intended to include values that are close to, but not exactly, the number. For example, in some embodiments, the term "approximately" may include values that are within +/−10 percent of the value.

Additional terms that are relevant to this disclosure will be defined at the end of this Detailed Description section.

Figure 1:
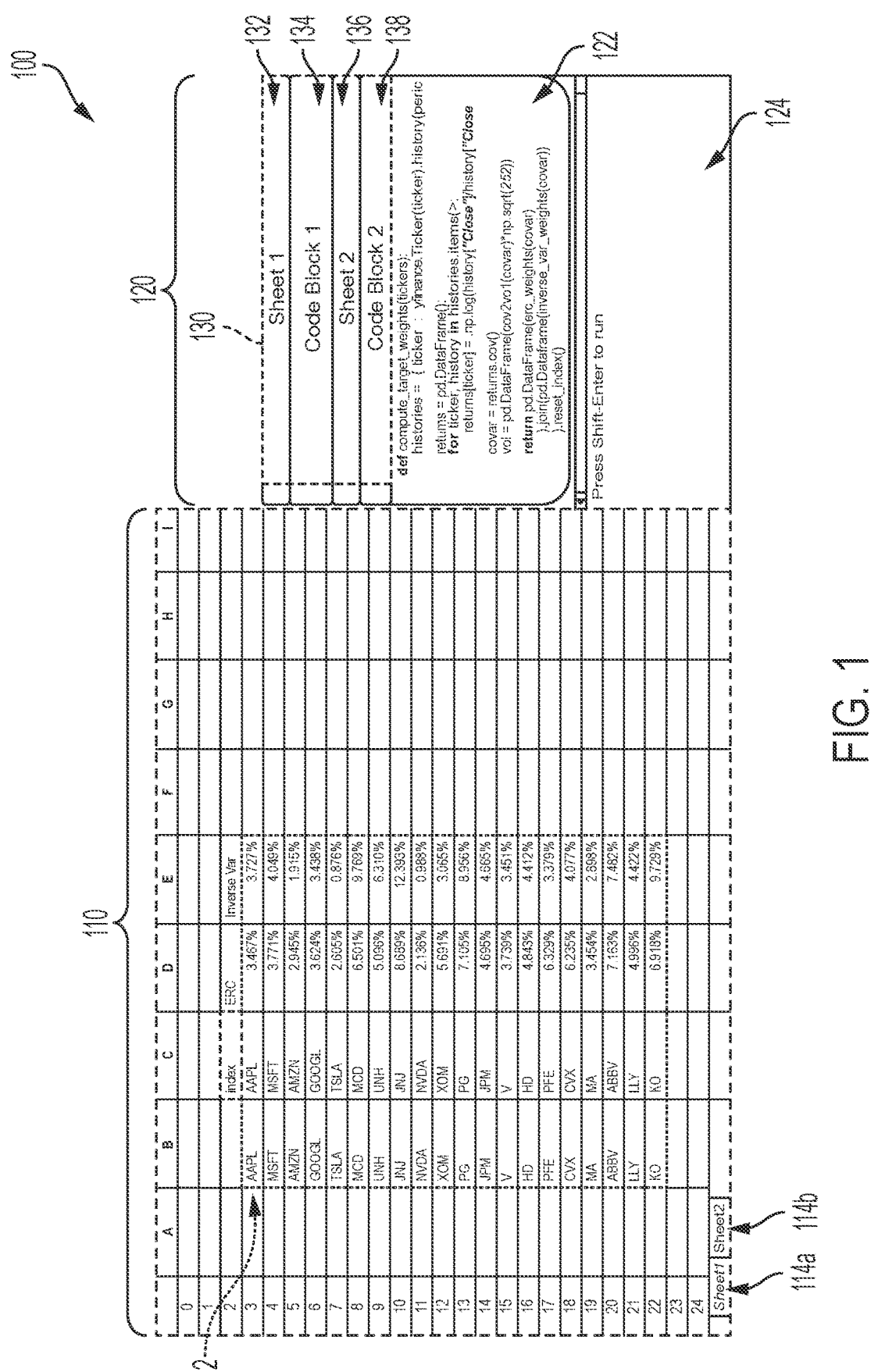
FIG. 1 illustrates an example user interface for a hybrid spreadsheet and coding environment.

Referring now to FIG. 1, an example graphical user interface (GUI) 100 for a hybrid coding environment includes, which includes multiple user interface areas. The user interface areas include a first interface area for displaying cells of a spreadsheet, which this document may refer to as a spreadsheet window 110. The user interface areas include a second interface area for displaying programing instructions and/or information corresponding to blocks of programming instructions. This document may include the second interface area as a coding window 120. The second interface area may include various user interface sub-areas such as execution window 130 for selecting an order in which code will be executed, and other sub-areas as will be described below. The GUI 100 and windows within it are generated by a processor executing a spreadsheet program and output on a display device, such as a display of a computing device.

The spreadsheet window 110 includes multiple cells that can be arranged in rows and columns. In the example of FIG. 1, the rows are labeled using numbers, while the columns are labeled using letters of the Latin alphabet. The cells of the spreadsheet window 110 can be occupied by data such as numbers, formulas, functions, strings, dates, times, or various combinations of these or other data. In the example of FIG. 1, the spreadsheet window 110 includes a group of occupied cells 112, which correspond to rows 3 through 22 and columns B through E of the example illustrated sheet. These cells contain data that can be edited and accessed throughout the spreadsheet window 110.

A spreadsheet program can display information arranged in multiple sheets, and the spreadsheet window 110 further includes tabs 114a and 114b, which respectively correspond to sheet/and sheet 2 of the spreadsheet file. In the example of FIG. 1, only the data in sheet 1 is displayed, however, like sheet 1, each sheet can include its own cells, each containing its own data. The data in each sheet can be held in each of the other sheets and selectively displayed in response to receiving a user's selection of a given sheet.

Not only can the GUI 100 display data across sheets of a spreadsheet file, the data can also be accessed in the coding window 120, a code editor window 122 and a code execution terminal, or simply terminal 124. The code editor window 122 allows a user to write and edit code contained in the window, which is also referred to as a code block, because it is a portion of code that is written and edited separately from other code blocks. The code of editor window 122 can incorporate data stored in the spreadsheet file. For example, the code in the code editor window 122 can reference a cell in the spreadsheet window 110, and use the data stored in the referenced cell as input to a function defined in the code. As another example, the code can store the data in the cell as a variable to be used elsewhere in the code editor window 122.

In the example of FIG. 1, the code editor window 122 displays the code of a second code block, or code block 2, while the code of a first code block, or code block 1, is not shown. The hybrid coding environment can include multiple code blocks, each containing its own code. The coding window 120 can display the code of a selected code block, or the code of multiple code blocks. In the example of FIG. 1, the second code block is selected such that the code displayed in the coding window 120 is the code of code block 2. The code of a selected code block can be executed using the terminal 124, which allows a user to test the code in a code block.

Data can be accessed across code blocks and sheets, for example, data from the first code block can be accessed in the code of a second code block, while the output of a code block can be stored or used by a cell in the spreadsheet file. In the example of FIG. 1, the hybrid coding environment GUI 100 includes the first code block shown in the code editor window 122 and the sheets 114*a* and 114*b*. A user may write a program in which a value stored in the sheet 114*a* is referenced in the code of the first code block. Furthermore, the first code block may produce an output that is fed into a function defined in the sheet 114*b*. This particular sequence of data access requires a certain order of execution. For example, code in the first code block uses the value stored in the sheet 114*a* and without the value, the code of the first code block would not be executable. Similarly, without the output produced by the first code block, the function defined in sheet 114*b* would not have an input, and therefore would produce an undefined output.

Therefore, an order of execution must be defined, as shown in the code execution window 130, which includes execution bars 132, 134, 136, and 138, which respectively correspond to sheet 1, code block 1, sheet 2, and code block 2. The user interface enables the execution bars to be reordered, e.g., by dragging and dropping. In the example illustration shown, the execution bars are arranged on the display as stacked on top of one another. The execution bar at the top of the stack is executed first, followed by the bar below, until the bar on the bottom of the stack is reached and executed. Therefore, in the example of FIG. 1, the order of execution is sheet 1, code block 1, sheet 2, and code block 2. However, other conventions can be used, e.g., positioning and executing bars starting with a leftmost bar and moving to a rightmost bar.

Figure 2:
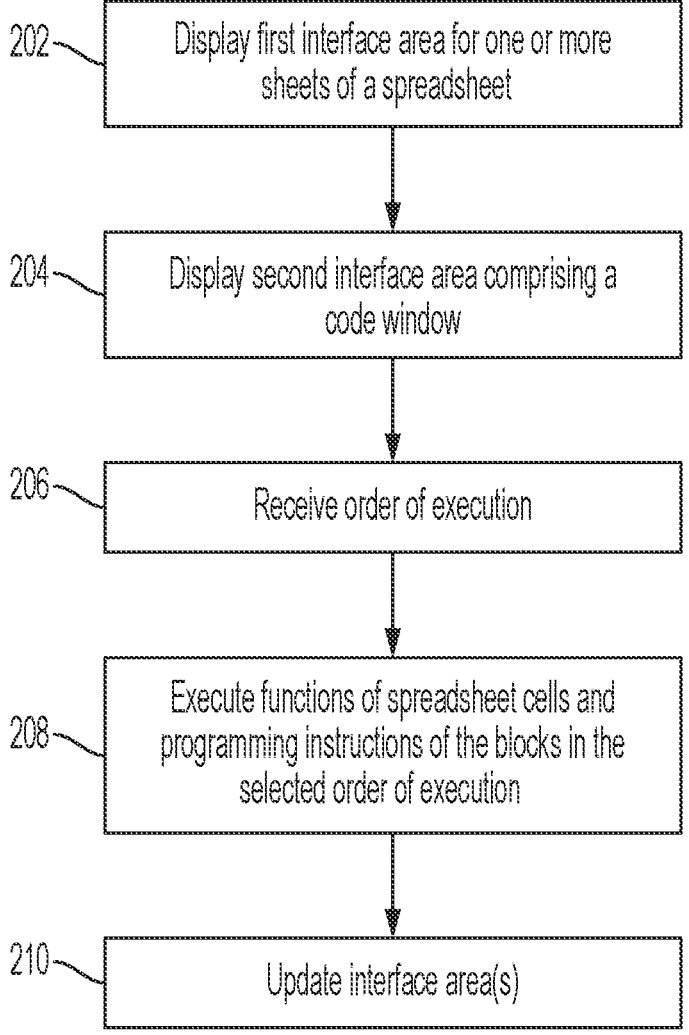
FIG. 2 is a flowchart for a method of receiving an order of execution for multiple sheets and/or code blocks and executing the sheets and/or code blocks according to the received order of execution.

Referring now to FIG. 2, a flowchart 200 for a method of receiving an order of execution for multiple sheets and/or code blocks and executing the sheets and/or code blocks according to the received order of execution, is provided. The flowchart is described as being performed by an example system. For example, the system can be a system of one or more computing devices configured to implement the hybrid coding environment 100.

At stage 202, the system displays a user interface comprising a first interface area for displaying one or more sheets of a spreadsheet containing multiple sheets. Each of the sheets comprises multiple cells, and each of the cells is fillable with data such as a variable, a function using a variable, a string, a date, a time, or various combinations of these. For example, the first interface area may allow a user to interact with the spreadsheet by filling cells of the multiple cells with data. The user can also use the first interface area to switch between different sheets of the spreadsheet, e.g., to view or edit the different sheets.

At stage 204, the system also displays, as part of the user interface, a second interface area comprising a coding window with one or more blocks of programming instructions. The programming instructions of the blocks, when executed, will update one or more of the variables used in at least some of the cells of the first interface area. For example, the second interface area allows the user to write and edit programming instructions, which are alternatively referred to simply as code.

At stage 206, the system receives, via the user interface, a selected order of execution for each of the sheets and blocks. For example, the selected order of execution can be provided by a user using execution bars, such as execution bars 132-138 of FIG. 1. By reordering the execution bars, the user can specify a desired order of the code's execution.

In some implementations, the system displays a list that includes each of the sheets and each of the blocks in a default order of operation. For example, the default order of execution can be the order in which the sheets or code blocks were created, with older sheets or code blocks being executed before older sheets or code blocks.

In general, any method for assigning an order to the sheets and code blocks can be used. For example, a user can specify a numerical value, from 1 to n, where n is the number of sheets plus the number of blocks. The numerical value can correspond to the order of execution, with execution starting with the sheet or block specified as number 1 and execution continuing in ascending order to number n.

At stage 208, the system executes the functions of the cells of each of the sheets and the programming instructions of the blocks in the selected order of execution to update values of the displayed one or more sheets. For example, functions stored in the cells can receive input from one or more other cells or from code in the code blocks and use that input to generate an output. Similarly, the code in the code blocks can receive input from one or more cells or from other portions of code and use that input to generate an output.

In some implementations, the default order of execution is saved to a memory as a directed acyclic graph. A graph is a set of nodes and edges which connect the nodes. For example, the nodes can represent either a sheet or a code block, while the edges can represent an ordering from a node to another node. Acyclic refers to a property such that each of the nodes of the graph is directed to another node such that following those directions never form a closed loop between the nodes. The modification to the default order of execution includes a modification to the directed acyclic graph. That is, modifying the order of execution can be achieved by modifying the edges of the directed acyclic graph.

The memory to which the order of execution is saved may be any suitable memory device or system. In some embodiments, the memory can be a local memory, e.g., one that is a physical component of the computing device that runs the hybrid computing environment. In addition, or in other embodiments, some or all of the memory can be a remote memory, such as a memory that is hosted at a data center and is written to and read from remotely by the computing device that runs the hybrid computing environment.

Other methods of maintaining and editing an order of execution can be used. For example, the order of execution can be stored using a linked list or an array. For example, each element of the linked list can represent a sheet or a code block (e.g., a pointer to a sheet or code block) and the connections between elements can represent the order of execution from a sheet or node of an element of the linked list to another sheet or node of another element. Modifying the order of execution can comprise modifying the connections between elements of the linked list. If an array is used, each element of the array can represent a sheet or a code block (e.g., a pointer to a sheet or code block) and the order of the elements within the array can represent the order of execution from a sheet or node of an element of the array to another sheet or node of another element.

At stage 210, the system updates the first interface area to include the updated values. For example, after generating an output the system can update the values displayed in the first interface area and/or the values displayed in the second interface area to the generated output. Optionally, at stage 210 the system also may update corresponding values in the second interface area, if the second interface area also displays output of various functions. The system also updates the values in whatever type or types of memory that stores the values.

Figure 3:
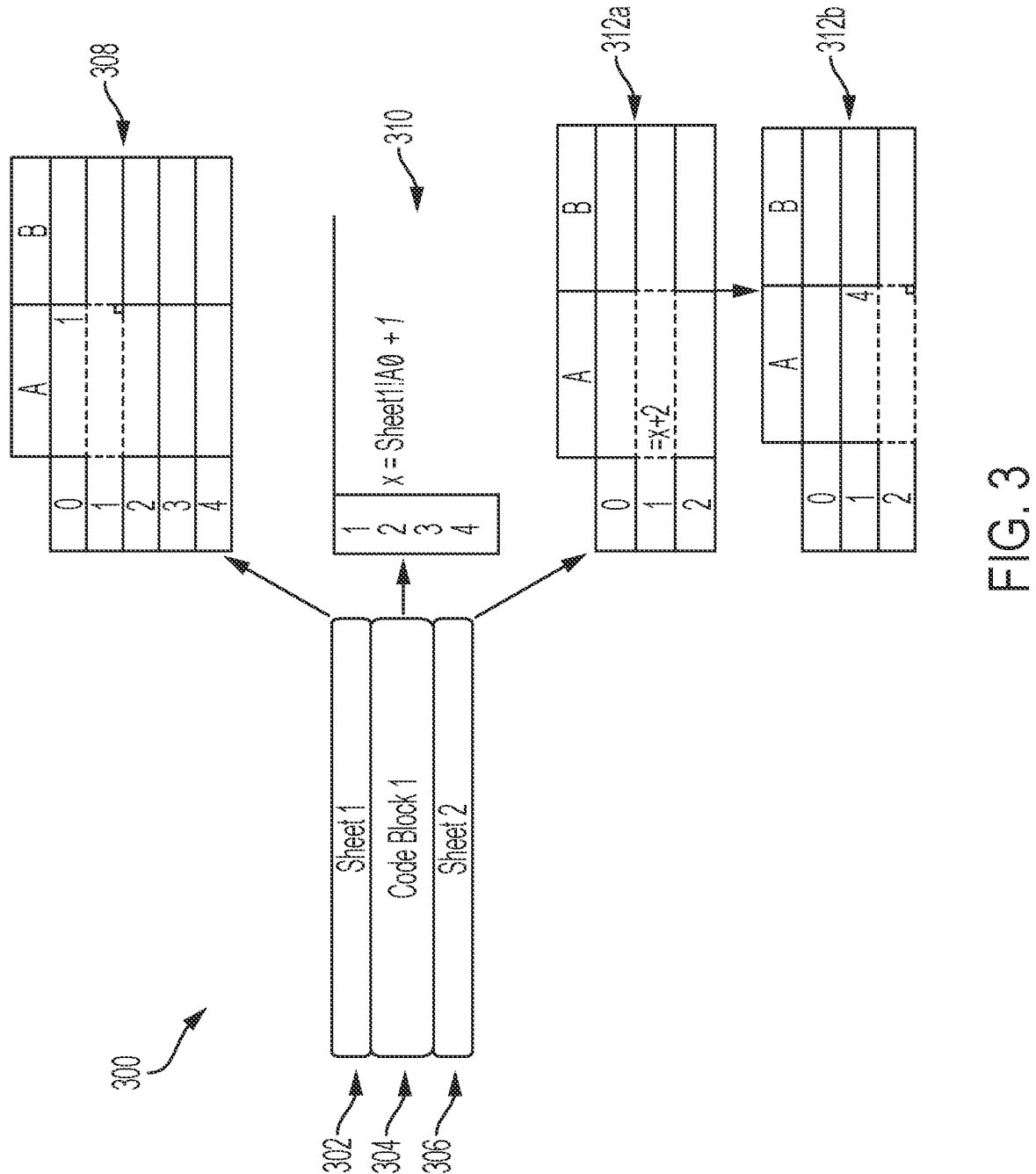
FIG. 3 is a diagram that includes three execution bars arranged in a first ordering.

Referring now to FIG. 3, a diagram 300 includes three execution bars, which include execution bar 302 for a first sheet or sheet 1, execution bar 304 for a first code block or code block 1, and execution bar 306 for a second sheet or sheet 2. FIG. 3 also shows a portion of the first sheet 308 and a portion of the first code block 310. The ordering of the execution bars 302-306 outlines the order of execution for an example workflow. That is, the ordering of execution bar 302 at the top of the order indicates that sheet 1 should be evaluated first, followed by code block 1 (as indicated by execution bar 304 being positioned next in the order), then sheet 2 (as indicated by execution bar 306, which is at the bottom of the order). Other visual indicators of order may be used, such as horizontal (ordered left to right, or right to left, depending on the language or custom used), or boxes that are stacked at least partially on top of each other.

The portion of the first sheet 308 displays the value of cell A0 as the number 1, while the portion of the first code block 310 displays the formula x=Sheet1!A0+1. In the formula shown in the portion of the first code block 310, "Sheet1!A0" refers to the value of cell A0 of sheet 1. In the example of FIG. 3, Sheet1!A0 refers to the number 1, because the value of cell A0 of sheet 1 is the number 1. Therefore, once the code of the portion of the first code block 310 is evaluated, the variable x is set to Sheet1!A0+1=(1)+1=2.

Finally, according to the ordering of the execution bars sheet 2 should be evaluated after the hybrid coding environment 100 evaluates code block 1. FIG. 3 shows a portion of sheet 2 labeled 312*a*, and the portion of sheet 2 displays the equation=x+2 in the cell A1. Evaluating sheet 2 with the value x=2, which was found by evaluating the second code block, the value of cell A1 is set to x+2=(2)+2=4. Therefore, evaluating the execution bars 302-306 in the order shown in FIG. 3 yields the final value of 4 in the cell A1 in sheet 2, as is shown at 312*b*.

Figure 4:
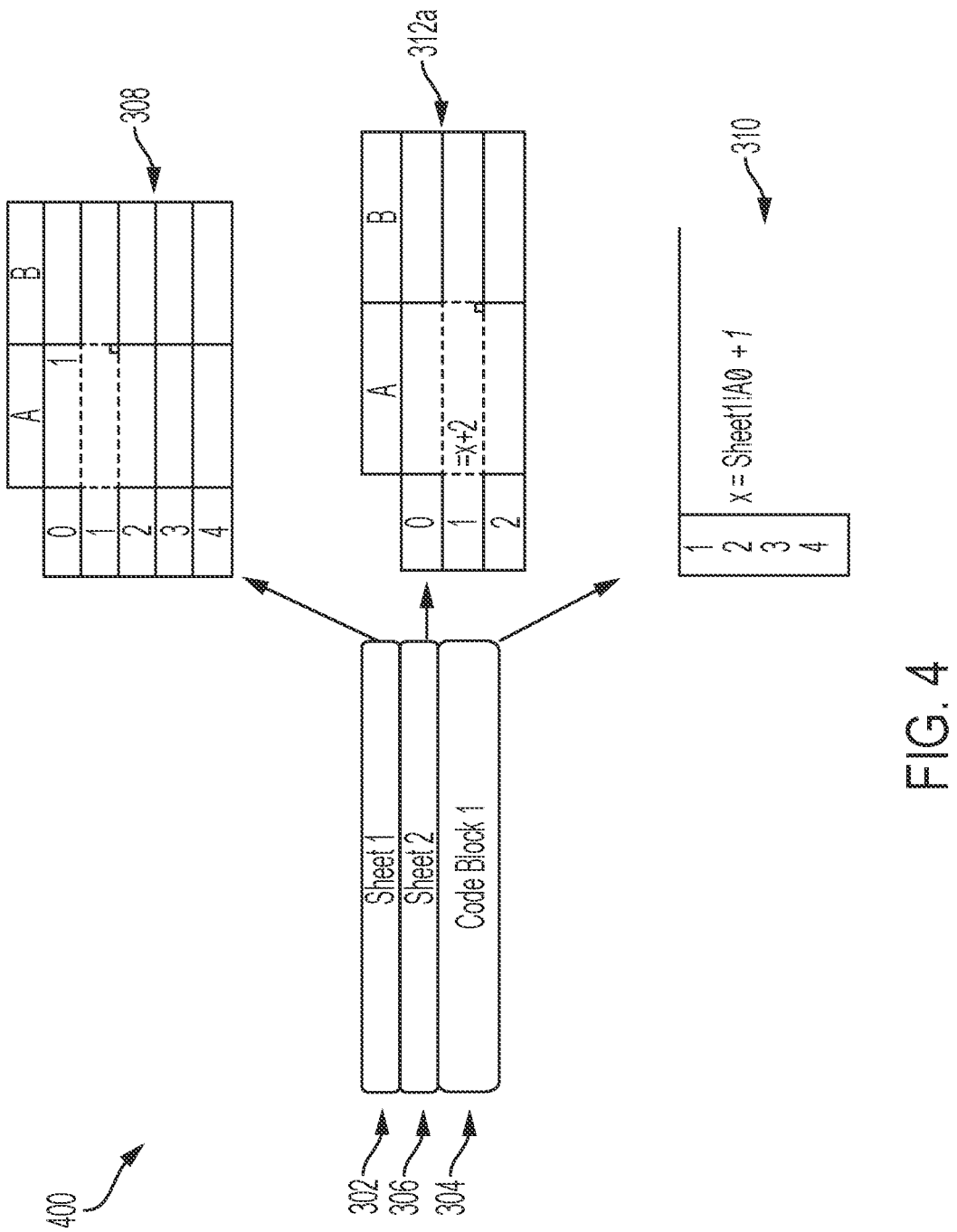
FIG. 4 is a diagram that includes the execution bars of FIG. 3, which are arranged in an ordering that is different from that which is shown in FIG. 3.

If a user provides the hybrid coding environment 100 input to reorder the execution bars 302-306 then the final value may change from 4 to another value. Referring now to FIG. 4, the execution bars 302-306 are arranged in an ordering that is different from that which is shown in FIG. 3. While the ordering shown in FIG. 3 is 302, 304, then 306, the ordering of the execution bars shown in FIG. 4 is 302, 306, then 304.

As in the example of FIG. 3, the portion of the first sheet 308 displays the value of cell A0 as the number 1. The portion of the second sheet 312*a* displays the equation=x+2 in the cell A1. Finally, the portion of the first code block 310 displays the equation x=Sheet1!A0+1. Evaluating the execution blocks 302-206 in the ordering shown in FIG. 4 begins with the cell A0, which stores the number 1. The next execution block to be evaluated is the second sheet. However, since the variable x is not defined, the value of A1 in the second sheet, which displays the equation=x+2 in the cell A1, is also undefined. That is, without the value of x, the cell A1 cannot be set to x+2. Finally, the hybrid coding environment 100 evaluates the portion of the first code block 310, which displays the equation x=Sheet1 !A0+1. Evaluating the equation yields x=Sheet1 !A0+1=(1)+1=2. Therefore, while the value of x is set to 4 following the execution of the execution blocks 302-306 in FIG. 3, with respect to the ordering of the execution blocks displayed in FIG. 4, the value of x is set to 2.

The hybrid coding environment described above can be configured to run on a local computing device, e.g., a user's desktop computer or laptop. Running locally means that the computing resources required by the hybrid coding environment, such as memory space and processing power, are provided solely by the local computer. However, the hybrid coding environment can also be configured to run on one or more remote computers. For example, the hybrid coding environment can be configured to run through cloud computing or edge computing. In some embodiments, the coding environment can run entirely in a cloud computing system and accessed by a local device; in other embodiments the coding environment may be purely local, or it may enable switching between local and remote operation. Examples of this will be described below. Optionally, in some embodiments, a local element may directly communicate with one or more elements by an application programming interface (API).

Cloud computing refers to using a network of remote servers to store, manage, and process data, rather than a local server or computer. Edge computing refers to identifying a remote server with the lowest latency between the server, often located in a data center, and the local device where the hybrid coding environment is being used. Generally, if all communication paths are equivalent, the lowest latency option is the data center that is physically closest to the local device. However, differences in network connectivity, communication path capacity and usage levels, communication service disruptions or other factors can result in a situation in which the nearest data center is not necessarily the data center of lowest latency. By determining the fastest connection between a local device and a data center, edge computing can minimize latency, which is the lag between a user action and the resultant computer response.

Figure 5:
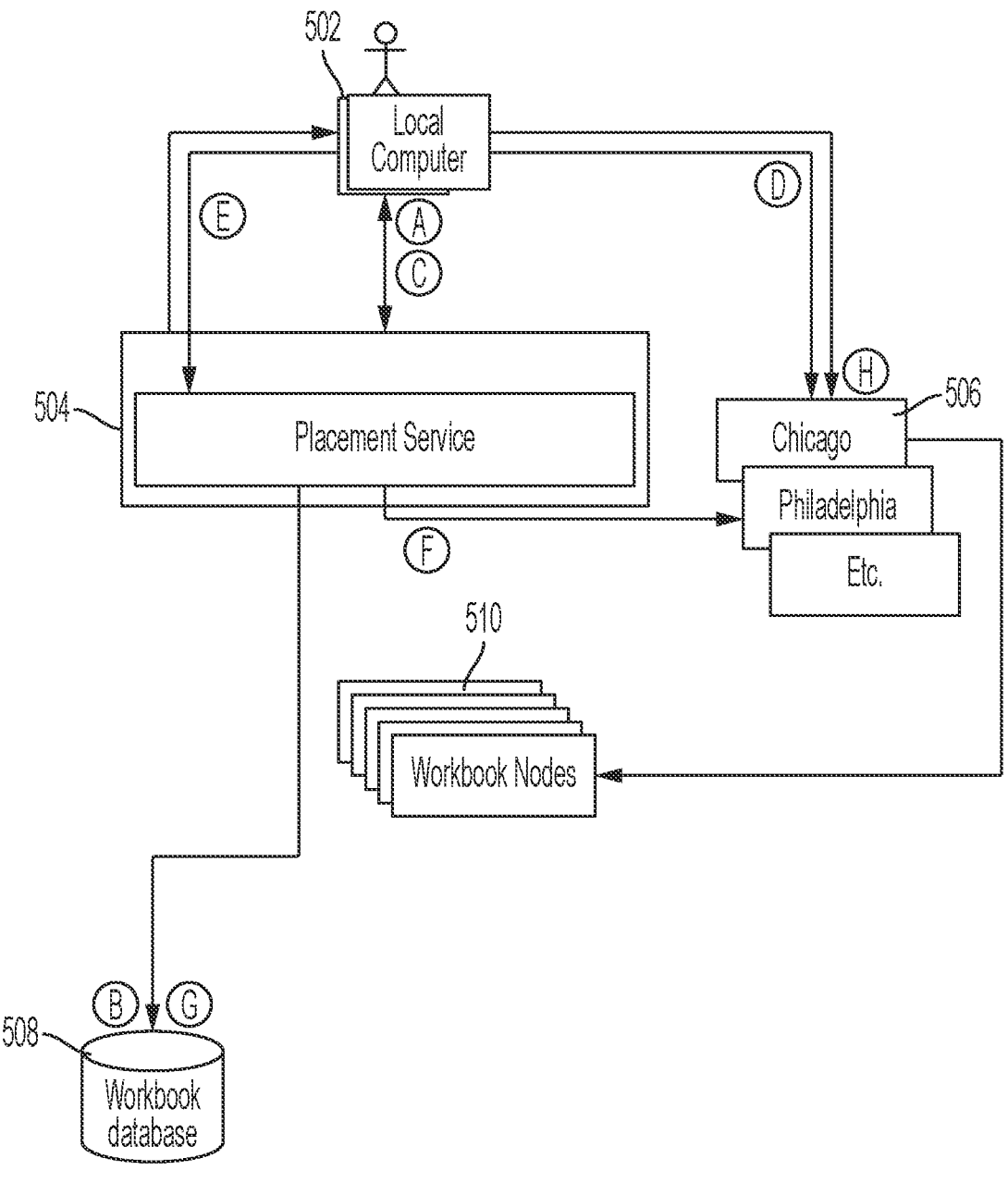
FIG. 5 is a block diagram that describes a latency test and a selection of an endpoint.

Referring to FIG. 5, a block diagram of a system that is configured for remote operation, or for hybrid local and remote operation, or for either option is shown. The system includes a local computing device 502 on which a web browser or other client application is installed. The browser or client application operates as a user interface to present information received from the remote server on a display of the local computing device 502, as well as to capture inputs and relay those inputs to the remote server.

The system also includes a placement service 504, which is a memory with programming instructions configured to cause a processing device to select one of multiple available endpoints 506. An endpoint 506 is a remote computing device, such as one of several geographically distributed data centers, that serves as a gateway to (i.e., is in communication with) one or more workbook nodes 510. Workbook nodes 510 are computing devices or servers that can host a workbook (i.e., a spreadsheet or files, including data of those files and processing capability to run the files, for a hybrid computing environment as described above) and send and receive information related to the hosted workbook to other elements of the system, such as the local computing device 502. The selection of an endpoint 506 is based on a measured or estimated latency between the endpoints 506 and the local computing device 502. The placement service 504 and/or local computing device 502 may measure latency using any now or hereafter known methods, such as by the simple method of sending test messages to each endpoint 506 and measuring the time to receive a response. Additional methods of estimating latency will be discussed in the process flow below.

The system further includes a workbook database 508, which the placement service 504 may query to determine which workbook nodes 510 are running an active instance of the spreadsheet, and also which endpoints provide a communication path. The placement service 504 may then measure latency associated with those endpoints to determine which of the endpoints 506 will provide a communication path to a workbook node 510 that can serve the workbook to the local computing device 502.

The block diagram of FIG. 5 also includes letters A-G, which are labels representing steps of a process flow for connecting to one of the endpoints 506 so that a local computer 502 can view and edit a workbook served by a workbook node 510. The lines connecting elements of FIG. 5 represent wired and/or wireless communication paths through which data can flow between elements.

At stage A the client application of the local computing device 502 sends a request to the placement service 504 to connect to a workbook. As noted above, a workbook is a file or set of files that provide a hybrid spreadsheet and coding environment as described above, which can include one or more spreadsheets and one or more code blocks.

At stage B the placement service 504 queries the workbook database 508 to see if the database includes information about which workbook nodes 510 may serve the workbook. If the workbook is already active (i.e., open and processing data for a local computing device), then the placement service will direct the local computer 502 to the workbook node 510 that is currently serving the workbook. However, if the request includes a request to create a new or inactive workbook, then the flow continues to stage C in which the web browser 502 returns a list or other data structure of regional endpoints and/or workbook nodes that are able to host the hybrid coding environment.

At stage D the local computing device 502 sends a message to each of the endpoints 506 that the placement service 504 identified in stage B. The local computing device 502 may measure the time to receive a response to each method, with the measured time for each endpoint being considered to be (or used in a function to estimate) the endpoint's latency. Additional methods of estimating latency will be discussed in the process flow below. At stage E the k endpoints with the lowest latency are selected. In this step, k may be a predetermined number, a random number, or a number determined by a function, such as a percentage of the total number of available endpoints. Information such as an identifier for the selected endpoints are sent to the placement service 504. These stages ensure that the local computing device 502 will be connected to the endpoint 506 with which it can communicate the fastest, therefore reducing the amount of time it takes to send and receive data from the endpoint 506.

At stage F the local computing device 502 or the placement service 504 selects an endpoint of the k endpoints sent at stage E. The placement service 504 then initiates a new, or instantiates an existing, workbook that runs on the workbook node 510 that is associated with the selected endpoint 506. In some embodiments, the endpoints themselves also may participate in the remote service of the workbook. For example, each of the workbook nodes 510 can be configured to run multiple workbooks and the nodes can include storage devices on which information related to the workbooks is saved. In some embodiments, the workbook data may be transferred from a workbook node to an endpoint via an API.

Optionally, workbook data also may be transferred from a local computer to an endpoint via an API.

At stage G the placement service 504 will update the workbook database 508 with the location of the workbook by saving an address or other identifier for the endpoint, the workbook node, or both to the workbook database.

At stage H the local computing device 502 initiates a connection to the workbook created in stage F. Accordingly, the local computing device 502 is able to send and receive information to and from the workbook node running the workbook file. Using this connection, the web browser 502 displays the workbook file on the local computer, but all processing of the workbook occurs on the remote workbook node and/or endpoint. The web browser 502 also communicates with the workbook node to send and receive information related to how the workbook file is edited. As with other stages, optionally the communication between local computer and endpoint, and/or communication between endpoint and workbook node, may be made via an API.

One advantage to running the hybrid coding environment remotely is that doing so eliminates the need to download and install an application that would run the hybrid coding environment on a local computer. Furthermore, running the hybrid coding environment remotely can offer upgrades in speed and computing power compared to running the environment on a local computer because conventional local computers have fewer computing resources (e.g., memory or processing power) than remote computers housed at a data center.

However, in some embodiments the local computing device may include an installed application that enables the spreadsheet to run completely on the local device, even if there is no communication with the remote server. The local application may include a selection interface that enables a user to select local or remote operation. When in a local operation mode, all data entered into and processed by the hybrid computing environment will be saved to a memory of the local computing device. When switched to a remote operation mode, all such data is transferred to the remote workbook node, and from that point forward all processing will occur on the remote workbook bode.

Figure 6:
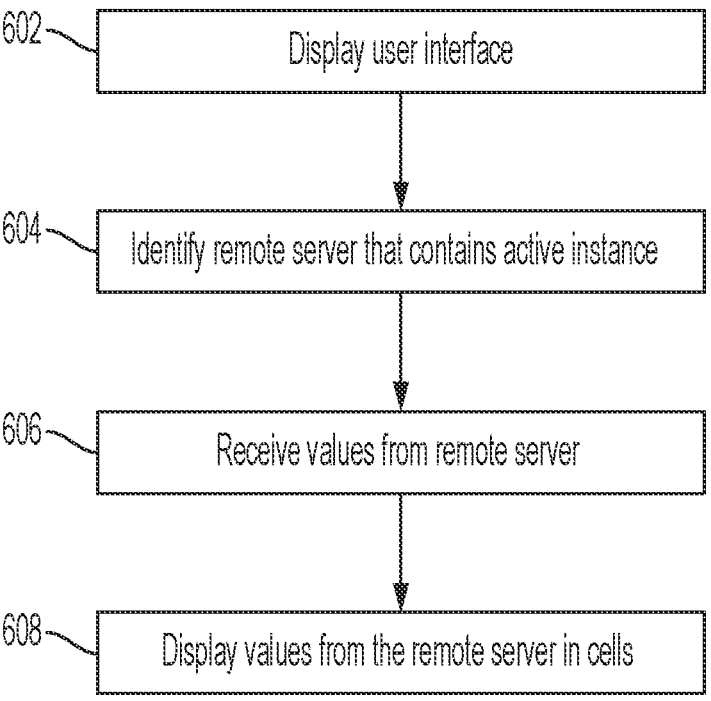
FIG. 6 is a flowchart for a method of receiving and displaying a value in a cell of a spreadsheet.

FIG. 6 illustrates the process of FIG. 5, and additional processes, in the form of a flowchart 600. The flowchart 600 illustrates a method of receiving and displaying a value in a cell of a spreadsheet. The flowchart 600 is described as being performed by an example system. For example, the system can be a system of one or more computing devices configured to implement the hybrid coding environment described above.

At stage 602 a local computing device of the system displays a user interface comprising a spreadsheet containing a plurality of cells. For example, the system can display the user interface on a computing device such as a desktop computer, a laptop, or a smartphone. The computing device can be configured to receive input from a user related to editing the spreadsheet. In some embodiments, the spreadsheet may be a typical spreadsheet file containing formulae and/or data for filing cells of one or more sheets of a spreadsheet. In other embodiments, the spreadsheet may be a hybrid spreadsheet and coding environment such as that described above in the discussion corresponding to FIGS. 1-4.

At stage 604 the system identifies a remote server (i.e., a workbook node or an endpoint) that contains an active instance, or that will be selected to serve an active instance, of the spreadsheet. For example, the local computing device that displays the user interface can be connected to a network, and the local computing device can send and receive information to and from the remote server through the network. The remote server can be configured to store, in a memory, active instances for each of multiple spreadsheets.

In some implementations, multiple data centers can be populated with information related to the same active instance of the spreadsheet and the system can choose an ideal data center to send and receive information related to the spreadsheet and communicate with the chosen data center. To choose an ideal data center, the system may identify multiple data centers that each contain the active instance of the spreadsheet. For example, the system may access a list of data centers that each contain the active instance. The system sends a signal to each of the data centers and receives, from at least some of the data centers, responses to the signal. For example, the signal can be an internet control message protocol (ICMP) echo request (i.e., a ping command), another type of packet or packets, or a pre-defined message of a certain size, sent from the computing device that displays the user interface to multiple different data centers. In some embodiments, the computing device may interface with one of the remote computing devices via a corresponding API.

Based on the responses, the system measures message latency between the data centers from which responses were received and the computing device. For example, the time measured between sending and receiving the message between the computing device and a first data center may be longer than the time measured between sending and receiving the message between the computing device and a second data center. Therefore, the first data center would have lower message latency than the second data center. The system identifies the data center having a lowest message latency as the remote server.

At stage 606 the system receives, from the remote server for each of the plurality of cells, a corresponding value to display in that cell. The remote server can store information related to the contents of each cell of the spreadsheet. Using a network connection, the remote server can send the information related to the contents of each cell to the computing device that displays the user interface.

At stage 608 the system displays, in each of the plurality of cells, the corresponding value as received from the remote server without performing any function on the computing device to calculate the corresponding value. The value of a cell can include numbers and variables having numerical values. The cells can also include mathematical equations. When the cells include mathematical equations, the equations are evaluated by the remote server.

For example, the computing device that displays the user interface sends information related to the contents of the cells to the remote server over the network and the contents of the cells are evaluated by the remote server and sent to the computing device. Therefore, the spreadsheet can include computationally intensive calculations, which are evaluated remotely on a remote server with access to computing resources, such as memory and processing power, that are greater than those available to the computing device that displays the user interface.

In some implementations, in addition to numbers, variables having numeric values, and mathematical equations, the values of a cell can include computer-readable code. For example, the computer-readable code can be code that is written in a certain programming language. In some implementations, the spreadsheet can include multiple cells each having computer-readable code of multiple different programming languages, such as in the embodiments described previously in this detailed description.

Figure 7:
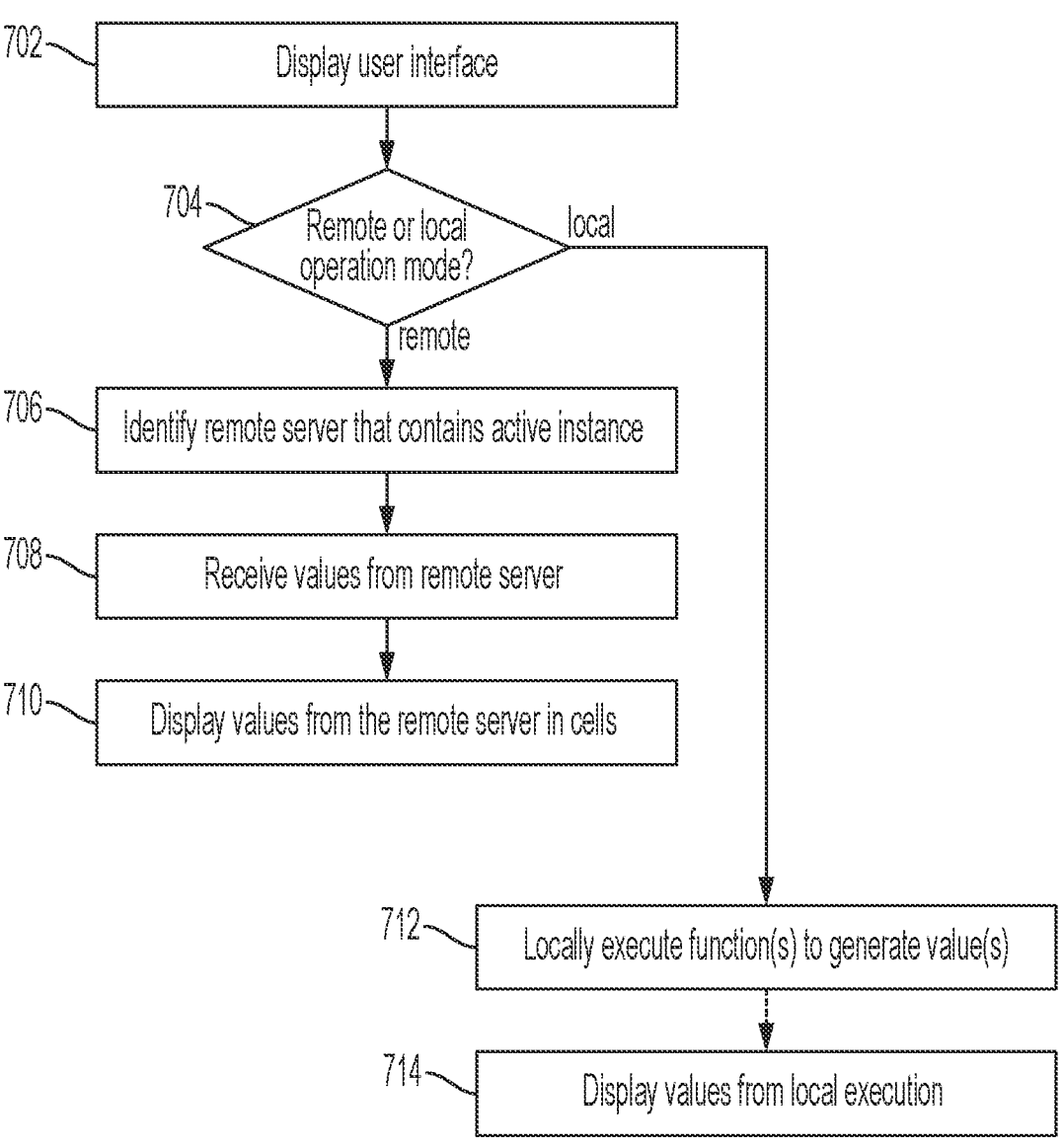
FIG. 7 is a flowchart for a method of receiving a selection of a remote operation mode or a local operation mode and displaying a value in a cell of a spreadsheet.

Referring now to FIG. 7 a flowchart 700 for a method of receiving a selection of a remote operation mode or a local operation mode and displaying a value in a cell of a spreadsheet is provided. The flowchart is described as being performed by an example system. For example, the system can be a system of one or more computing devices configured to implement the hybrid coding environment.

At stage 702 the system displays a user interface comprising a spreadsheet containing a plurality of cells. For example, the system can display the user interface on a computing device such as a desktop computer, a laptop, or a smartphone. The computing device can be configured to receive input from a user related to editing the spreadsheet.

At stage 704 the system receives from a user via the user interface, a selection of a remote operation mode or a local operation mode. Depending on the configuration of the system, this selection may be received before the system displays the user interface at 702, or after the user interface is displayed. For example, the system may use the user interface to prompt the user to select a remote operation mode or a local operation mode. Optionally, the selectable prompt may be an element of the user interface. Optionally, if the system presents a prompt to the user, the system may implement an action by default if the user does not make a selection before a defined period of time from the time of the prompt elapses. For example, if the user does not select remote operation within the defined period of time, the system may default to a local operation mode. Alternatively, if the user does not select local operation within the defined period of time, the system may default to a remote operation mode.

The remote operation mode is one in which execution of information, such as functions and mathematical calculations, present in one or more cells of the spreadsheet is performed by a remote server. The local operation mode is one in which the execution of information is performed by the computing device that displays the user interface.

If the selection is for the remote operation mode (704: remote), in stage 706 the system identifies a remote server that is contains an active instance, or that will be selected to serve an active instance, of the spreadsheet. The methods by which the system may do this are described in the discussion of step 604 of FIG. 6.

In stage 708 the system receives, from a remote server for each of the plurality of cells, a corresponding value to display in that cell, and in stage 710 the system displays, in each of the plurality of cells, the corresponding value as received from the remote server without performing any function on the computing device to calculate the corresponding value. For example, one or more of the cells of the spreadsheet can include information such as a mathematical calculation. When the system receives the selection of the remote operation mode, mathematical calculations are performed by the remote server, which can then send the result of the mathematical calculation to the computing device through a network.

If the selection is not for the remote operation mode (704: local) then, for at least some of the plurality of cells, in stage 712 the local processor of the system executes a function to generate a corresponding value for those cells, and in stage 714 the system displays, in each of those cells, the corresponding locally-generated value for that cell. For example, when the remote operation mode is not selected, the system operates in the local operation mode. In the location operation mode, a computing device of the system executes functions or mathematical operations using the hardware of the computing device and the software stored on the computing device.

Figures 8A, 8B, 8C:
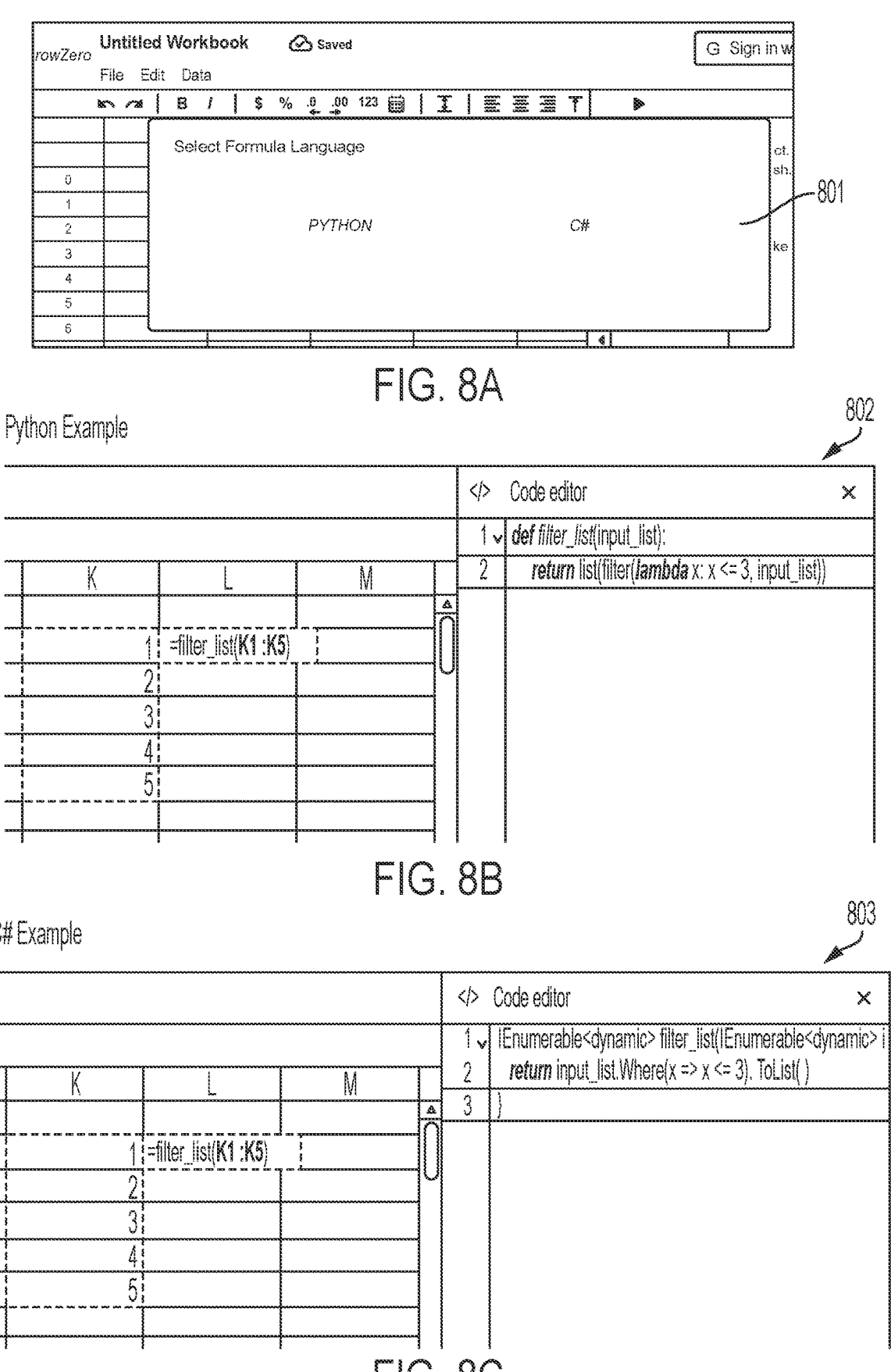
FIGS. 8A-8C illustrate examples by which a hybrid spreadsheet system may support multiple programming languages.

In any of the aspects described above, the interface area that receives programming code may enable users to write formulas and/or functions in any of multiple programming languages, and the spreadsheet will convert code and/or data from the selected programming language into code that can be processed by the spreadsheet syntax (i.e., the spreadsheet's formula language). For example, as illustrated in FIG. 8A, the system may support the Python and C# programming languages, and the system may display a selectable prompt 801 via which it may receive a user selection of a programming language that the user will use for a spreadsheet created during that session, and in future sessions that involve the same spreadsheet. The user's response to that prompt will direct the programming language that the coding window will accept. The spreadsheet will then convert the received code, or data processed by that code, into a code or data that can be processed by the spreadsheet formula language.

If the user selects Python, then as FIG. 8B shows at 802 the coding window will accept and display Python-formatted formulae that can generate the values. The spreadsheet formula may reference its corresponding coding window formula, or vice versa (or the formulae may reference each other). The system will convert the Python-formatted formulae and/or generated values to code or values that can be processed by the spreadsheet formula language. By way of a very basic example, consider a spreadsheet that includes a cell that contains the spreadsheet formula:

```
foo(B1:B10)
and a corresponding coding window contains the formula:
def foo (range) :
    total = 0
    for x in range:
        total = total + x
    return total.
```

In the example above, the function foo is defined in Python and referenced by name (foo) in the spreadsheet formula. To evaluate the function foo(B1:B10) in the spreadsheet, the system will convert the data in spreadsheet cells B1:B10 to a format that Python can understand and pass the converted data to a Python formula evaluator (described below). The Python formula evaluator will evaluate foo and compute a value x. The system will then convert the value x into spreadsheet syntac and store the result.

If the user selects C#, then as illustrated in FIG. 8C at 803 the coding window will accept and display C#-formatted formulae that can generate the values that are referenced, which formulae and/or variables are then converted to code or values that the spreadsheet can process. The displayed values are the same in each case. The system can do this by decoupling the spreadsheet's functionality from its formula evaluation.

Figure 9:
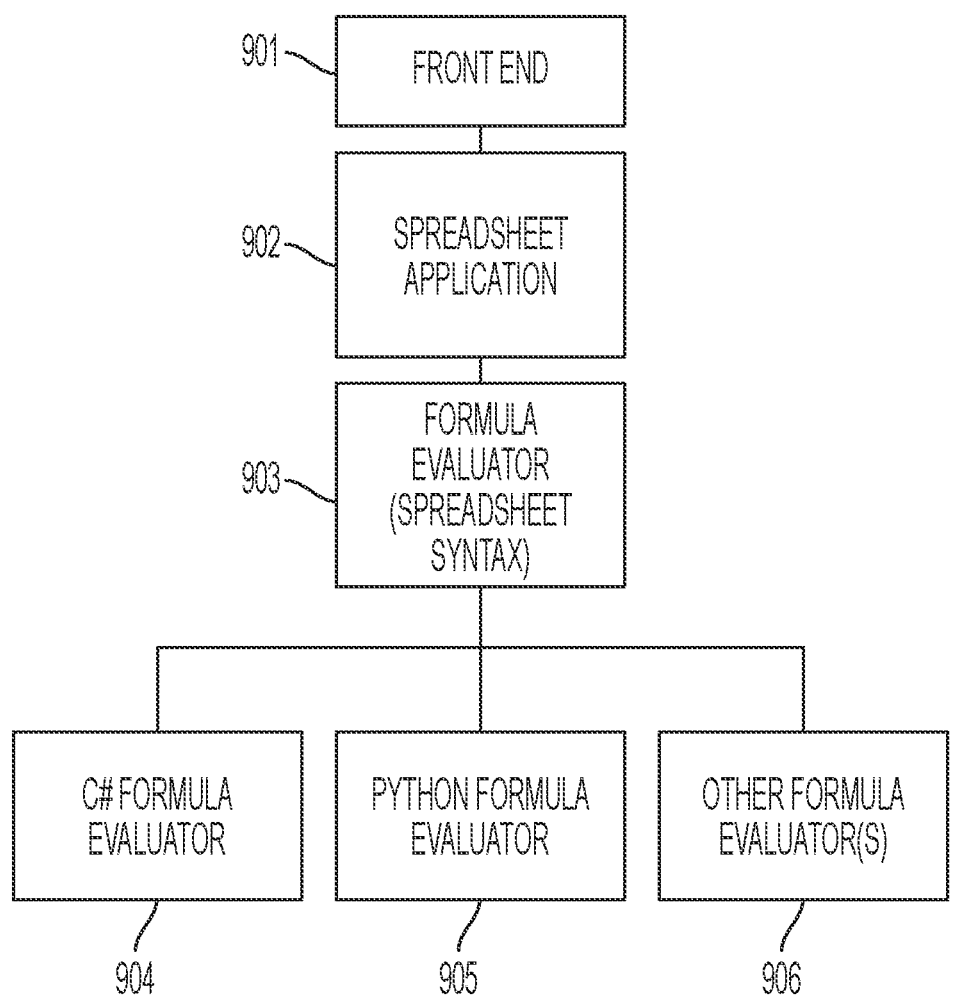
FIG. 9 illustrates an example system architecture for supporting multiple programming languages.

This is illustrated by way of example in FIG. 9, which shows that the spreadsheet application 902, which is operating on either the local computing device or the remote computing device behind the front end user interface 901, may include or call upon any number of formula evaluators 906. A formula evaluator is a software module with programming instructions configured to process the code of a cell, optionally in the spreadsheet syntax and/or more selected or assigned programming languages to yield values, and then use simple PUT and GET functions or other methods to write the values to a common key-value store. When processing the code of a cell. The key-value store includes keys, each of which is associated with a corresponding one of the cells, and values that are associated with cells. The formula evaluators also may retrieve values from the key-value store when a key is identified. The PUT function will write a value to the key-value store (e.g., PUT "A1" "=1+1"). The GET function will retrieve a value from the key-value store. For example, GET "A1" will return 2 after the above-described PUT function has been completed.

Formulas may reference other keys in the store, for example:

PUT "A1" "42"
PUT "A2" "=A1+1"
GET "A2"=>returns 43

When a value of a cell is updated, the formula evaluator will automatically recompute dependent values and write the recomputed values to the data store. Continuing the last example:

PUT "A1" "43"
GET "A2"=>returns 44

The Python Formula Evaluator 904 processes the formulas that were written in Python code. The C# Formula Evaluator 905 processes the formulas that were written as C# code. Other formula evaluators 906 will implement the formulas written in their assigned code. Each user who then accesses a particular spreadsheet may then use the code that was selected in response to the initial prompt 801 to set up the spreadsheet, as the key-value store will ensure that values remain consistent no matter which code was selected at the start. A spreadsheet formula evaluator 903 also may be available to process any formulas that follow the syntax of the spreadsheet.

In addition, the system may enable execution of spreadsheet functions alongside functions that reference code or values written in any of the supported programming languages. For example, as illustrated in FIG. 10, a Python spreadsheet may include a cell with the formula =SUM(K1:K5). In spreadsheet syntax for popular spreadsheets like Microsoft Excel and Google sheets, the expression K1:K5 means "return the values K1, K2, K3, K4 and K5". When the =SUM(K1:K5) spreadsheet function is executed, it returns the expected result of a value of 15. In addition, in a Python spreadsheet, a new function can be written in the Python coding window that takes the range K1:K5 and executes a custom Python function called 'filter list,' which is defined in Python and takes the input range and returns a list of the values less than '3.' Filter list is not a standard spreadsheet function and in order to execute it, the spreadsheet must convert the Python function into code that can be processed by the spreadsheet in order to return an answer. In the case of FIG. 10, the result is a list of values 1, 2, and 3. Conversion to and from other programming languages would happen in the same manner.

The decoupling of spreadsheet functionality from formula evaluation described above in FIGS. 8 and 9 enable the system to offer a user the opportunity to create and/or edit a spreadsheet in a particular programming language via a browser or other remote application running on the user's local device, even if the programming language is not installed or otherwise supported on the user's local device.

Figure 11:
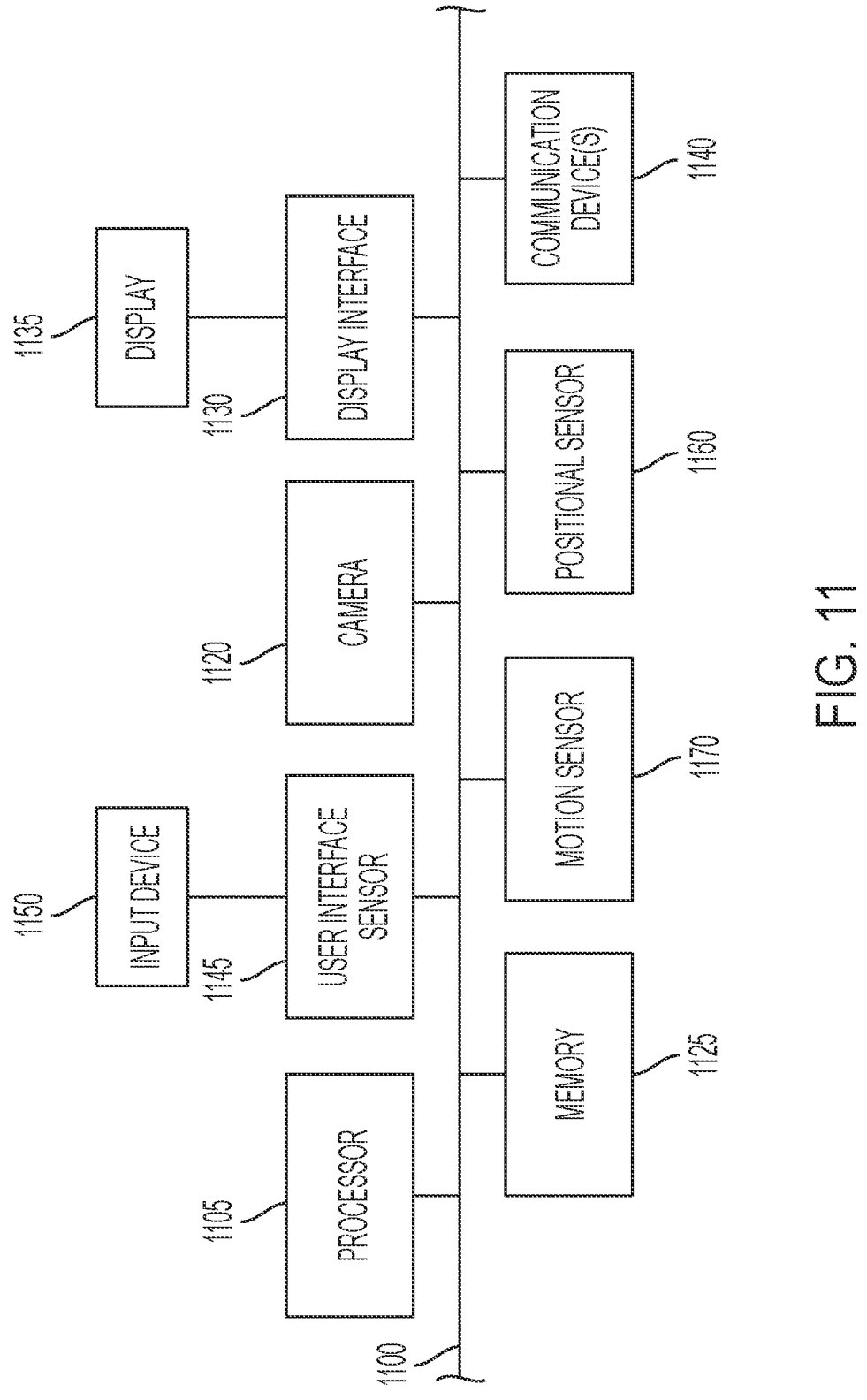
FIG. 11 is an example of internal hardware that may be included in any of the electronic components of a computing system.

FIG. 11 depicts an example of internal hardware that may be included in any of the electronic components of a computing system, such as the user's smartphone or a local or remote computing device in the system. An electrical bus 1100 serves as a communication path via which messages, instructions, data, or other information may be shared among the other illustrated components of the hardware. Processor 1105 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 1125. A memory device may include a single device or a collection of devices across which data and/or instructions are stored.

An optional display interface 1130 may permit information from the bus 1100 to be displayed on a display device 1135 in visual, graphic or alphanumeric format. An audio interface and audio output (such as a speaker) also may be provided. Communication with external devices may occur using various communication devices 1140 such as a wireless antenna, a radio frequency identification (RFID) tag and/or short-range or near-field communication transceiver, each of which may optionally communicatively connect with other components of the device via one or more communication systems. The communication device 1140 may be configured to be communicatively connected to a communications network, such as the Internet, a local area network or a cellular telephone data network.

The hardware may also include a user interface sensor 1145 that allows for receipt of data from input devices 1150 such as a keyboard, a mouse, a joystick, a touchscreen, a touch pad, a remote control, a pointing device and/or microphone. Digital image frames also may be received from a camera 1120 that can capture video and/or still images. The system also may include a positional sensor 1180 and/or motion sensor 1170 to detect position and movement of the device. Examples of motion sensors 1170 include gyroscopes or accelerometers. Examples of positional sensors 1180 include a global positioning system (GPS) sensor device that receives positional data from an external GPS network.

In this document, the term "connected", when referring to two physical structures, means that the two physical structures touch each other. Devices that are connected may be secured to each other, or they may simply touch each other and not be secured.

In this document, the term "electrically connected", when referring to two electrical components, means that a conductive path exists between the two components. The path may be a direct path, or an indirect path through one or more intermediary components.

When used in this document, terms such as "top" and "bottom," "upper" and "lower", or "front" and "rear," are not intended to have absolute orientations but are instead intended to describe relative positions of various components with respect to each other. For example, a first component may be an "upper" component and a second component may be a "lower" component when a device of which the components are a part is oriented in a first direction. The relative orientations of the components may be reversed, or the components may be on the same plane, if the orientation of the structure that contains the components is changed. The claims are intended to include all orientations of a device containing such components.

An "electronic device" or a "computing device" refers to a device or system that includes a processor and memory.

Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include personal computers, servers, mainframes, virtual machines, containers, gaming systems, televisions, digital home assistants and mobile electronic devices such as smartphones, fitness tracking devices, wearable virtual reality devices, Internet-connected wearables such as smart watches and smart eyewear, personal digital assistants, cameras, tablet computers, laptop computers, media players and the like. Electronic devices also may include appliances and other devices that can communicate in an Internet-of-things arrangement, such as smart thermostats, refrigerators, connected light bulbs and other devices. Electronic devices also may include components of vehicles such as dashboard entertainment and navigation systems, as well as on-board vehicle diagnostic and operation systems. In a client-server arrangement, the client device and the server are electronic devices, in which the server contains instructions and/or data that the client device accesses via one or more communications links in one or more communications networks. In a virtual machine arrangement, a server may be an electronic device, and each virtual machine or container also may be considered an electronic device. In the discussion above, a client device, server device, virtual machine or container may be referred to simply as a "device" for brevity. Additional elements that may be included in electronic devices are discussed above in the context of FIG. 8.

The terms "processor" and "processing device" refer to a hardware component of an electronic device that is configured to execute programming instructions. Except where specifically stated otherwise, the singular terms "processor" and "processing device" are intended to include both single-processing device embodiments and embodiments in which multiple processing devices together or collectively perform a process.

The terms "memory," "memory device," "computer-readable medium," "data store," "data storage facility" and the like each refer to a non-transitory device on which computer-readable data, programming instructions or both are stored. Except where specifically stated otherwise, the terms "memory," "memory device," "computer-readable medium," "data store," "data storage facility" and the like are intended to include single device embodiments, embodiments in which multiple memory devices together or collectively store a set of data or instructions, as well as individual sectors within such devices. A computer program product is a memory device with programming instructions stored on it.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices. The network may include or is configured to include any now or hereafter known communication networks such as, without limitation, a BLUETOOTH® communication network, a Z-Wave® communication network, a wireless fidelity (Wi-Fi) communication network, a ZigBee communication network, a HomePlug communication network, a Power-line Communication (PLC) communication network, a message queue telemetry transport (MQTT) communication network, a MTConnect communication network, a cellular network a constrained application protocol (CoAP) communication network, a representative state transfer application protocol interface (REST API) communication network, an extensible messaging and presence protocol (XMPP) communication network, a cellular communications network, any similar communication networks, or any combination thereof for sending and receiving data. As such, network 204 may be configured to implement wireless or wired communication through cellular networks, WiFi, BlueTooth, Zigbee, RFID, BlueTooth low energy, NFC, IEEE 802.11, IEEE 802.15, IEEE 802.16, Z-Wave, Home Plug, global system for mobile (GSM), general packet radio service (GPRS), enhanced data rates for GSM evolution (EDGE), code division multiple access (CDMA), universal mobile telecommunications system (UMTS), long-term evolution (LTE), LTE-advanced (LTE-A), MQTT, MTConnect, CoAP, REST API, XMPP, or another suitable wired and/or wireless communication method. The network may include one or more switches and/or routers, including wireless routers that connect the wireless communication channels with other wired networks (e.g., the Internet). The data communicated in the network may include data communicated via short messaging service (SMS), multimedia messaging service (MMS), hypertext transfer protocol (HTTP), direct data connection, wireless application protocol (WAP), e-mail, smart energy profile (SEP), ECHONET Lite, OpenADR, MTConnect protocol, or any other protocol.

While this disclosure describes example embodiments for example fields and applications, it should be understood that the disclosure is not limited to the disclosed examples. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described in this document. Further, embodiments (whether or not explicitly described) have significant utility to fields and applications beyond the examples described in this document.

The features from different embodiments disclosed in this document may be freely combined. For example, one or more features from a method embodiment may be combined with any of the system or product embodiments. Similarly, features from a system or product embodiment may be combined with any of the method embodiments herein disclosed. This, references in this document to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described in this document.

As described above, this document discloses system, method, and computer program product embodiments for implementing a hybrid spreadsheet and coding environments. The system embodiments include a local computing device, which may have access to one or more remote computing devices. In some embodiments, one or more of the remote computing devices also may be part of the system. The computer program embodiments include programming instructions, stored in a memory device, that are configured to cause a processor to perform the methods described in this document.

Without excluding further possible embodiments, certain example embodiments are summarized in the following clauses:

Clause 1: A method of implementing a spreadsheet, in which the method comprises, by a processor causing a display to display a user interface. The user interface comprises a first interface area for displaying one or more sheets of a spreadsheet containing multiple sheets. Each of the sheets comprises a plurality of cells. Each of the cells is fillable with data. The user interface also comprises a second interface area comprising a coding window corresponding to one or more blocks of programming instructions. The programming instructions, when executed, will cause a computing device to update one or more of the variables used in at least some of the cells. The method also includes, in response to receiving via the user interface a selected order of execution for each of the sheets and each of the blocks, executing the functions of the cells of each of the sheets and the programming instructions of the blocks in the selected order of execution to update values of the cells of each of the sheets. The method also includes updating a plurality of the cells displayed in the first interface area to include the updated values.

Clause 2: The method of clause 1, wherein receiving the selected order of execution comprises (a) displaying a list that includes each of the sheets and each of the blocks in a default order of execution, and (b) receiving, via the user interface, the selected order of execution as a modification to the default order of execution.

Clause 3: The method of clause 2, wherein the default order of execution is saved to a memory as a directed acyclic graph, and the modification to the default order of execution comprises a modification to the directed acyclic graph.

Clause 4: The method of any of clauses 1-3 further comprising receiving, via the user interface, a selected programming language from a plurality of candidate programming languages. In the embodiment of this clause 4, executing the functions of the cells and the programming instructions of the blocks comprises using functions in the spreadsheet formula language that reference functions or data in the selected programming language-.

Clause 5: The method of any of clauses 1-4, wherein the coding window comprises (a) a code editor window via which a user may enter and/or revise the one or more blocks of programming instructions, and (b) an execution window comprising a plurality of execution bars that may be reordered to define an order of execution of the code blocks.

Clause 6: The method of clause 5, wherein the execution window further comprises an additional plurality of execution bars that may be reordered to define an order of execution of the multiple sheets of the spreadsheet.

Clause 7: The method of any of clauses 1-6, wherein executing the functions of the cells of each of the sheets in the selected order of execution to update values of the cells of each of the sheets comprises: (a) identifying a remote server via which an active instance of the spreadsheet is available; (b) transmitting the selected order of execution to the remote server; and (c) receiving, from the remote server, for each of the plurality of cells, a corresponding value to display in that cell, wherein the value resulted from executing the functions of the cells and the programming instructions of the blocks in the selected order of execution.

Clause 8: The method of clause 7, wherein identifying the remote server comprises: (a) identifying a plurality of data centers that each contain or provide a gateway to at least one active instance of the spreadsheet; (b) sending messages to each of the data centers; (c) receiving, from at least some of the data centers, responses to the messages; (d) based on the responses, measuring message latency between the data centers from which responses were received and the computing device; and (e) selecting the data center having a lowest message latency as the remote server.

Clause 9: The method of clause 7 or 8, wherein the remote server is an endpoint that provides a communication path to a workbook node from which the active instance of the spreadsheet is served.

Clause 10: The method of any of clauses 7-19, wherein: one or more of the plurality of cells contains computer-readable code in the spreadsheet formula language that references functions or data in the selected programming language, which when read by the computing device can change the value or values displayed in one or more of the plurality of cells. In this embodiment, the first programming language is not installed on the processor of the computing device.

Clause 11: The method of any of clauses 7-10, further comprising receiving, via the user interface, a selected programming language from a plurality of candidate programming languages. In this embodiment, executing the functions of the cells comprises using functions in the spreadsheet formula language that reference functions or data in the selected programming language.

Clause 12: The method of any of clauses 7-11, wherein executing the functions in the spreadsheet formula language that may reference functions or data in the selected programming language comprises: (a) identifying, from a plurality of candidate formula evaluator modules, a formula evaluator module that is associated with the selected programming language; (b) using the identified a formula evaluator module to process functions associated with the plurality of cells to generate, for at least a subset of the cells, a plurality of values; and (c) writing the plurality of values to a key-value store in association with keys that correspond to at least the subset of the cells.

Clause 13: The method of any of clauses 7-12, wherein receiving the selected order of execution comprises (a) displaying a list that includes each of the sheets and each of the blocks in a default order of execution and (b) receiving, via the user interface, the selected order of execution as a modification to the default order of execution.

Clause 14: The method of clause 13, wherein (a) the default order of execution is saved to a memory as a directed acyclic graph, and (b) the modification to the default order of execution comprises a modification to the directed acyclic graph.

Clause 15: The method of any of clauses 7-14 further comprising receiving, via the user interface, a selected programming language from a plurality of candidate programming languages. In this embodiment, executing the functions of the cells and the programming instructions of the blocks comprises using functions in the spreadsheet formula language that reference functions or data in the selected programming language-.

Clause 16: The method of any of clauses 7-15, wherein the coding window comprises: a code editor window via which a user may enter and/or revise the one or more blocks of programming instructions; and an execution window comprising a plurality of execution bars that may be reordered to define an order of execution of the code blocks.

Clause 17: The method of clause 16, wherein the execution window further comprises an additional plurality of execution bars that may be reordered to define an order of execution of the multiple sheets of the spreadsheet.

Clause 18: A computer program product comprising a memory device and programming instructions that are configured to cause one or more processors to implement a method of any of clauses 1-17.

Clause 19: A system comprising one or more processors, as well as a computer program product of any embodiment of clause 18.

Clause 20: A method comprising, by a processor of a local computing device, executing programming instructions that cause the local computing device to implement a spreadsheet application by: (a) displaying a user interface comprising a spreadsheet containing a plurality of cells; (b) identifying a remote server that contains an active instance of the spreadsheet by: (i) identifying a plurality of data centers that each contain or provide a gateway to at least one active instance of the spreadsheet, (ii) sending a message to each of the data centers, (iii) receiving, from at least some of the data centers, responses to the message, (iv) based on the responses, measuring message latency between the data centers from which responses were received and the computing device, and (v) selecting the data center having a lowest message latency as the remote server; (c) receiving, from the remote server for each of the plurality of cells, a corresponding value to display in that cell; and (d) displaying, in each of the plurality of cells, the corresponding value as received from the remote server without the computing device performing any function to calculate the corresponding value.

Clause 21: The method of clause 20, wherein the user interface displays a prompt that enables a user to select a programming language. When the user selects one of the cells when displayed on the local computing device, the user interface displays a function that is associated with the selected cell in the spreadsheet formula language that may reference functions or data in the selected programming language.

Clause 22: The method of clause 20 or 21, wherein the remote server is an endpoint that provides a communication path to a workbook node from which the active instance of the spreadsheet is served.

Clause 23: The method of any of clauses 20-22, further comprising: (a) receiving, via the user interface, a selected programming language from a plurality of candidate programming languages; and (b) displaying, in the user interface, functions associated with the cells in the spreadsheet formula language that reference functions or data in the selected programming language-.

Clause 24: The method of clause 23 further comprising, by the remote server: (a) identifying, from a plurality of candidate formula evaluator modules, a formula evaluator module that is associated with the selected programming language) using the identified a formula evaluator module to process the functions associated with the plurality of cells to generate, for at least a subset of the cells, a plurality of values; and (c) writing the plurality of values to a key-value store in association with keys that correspond to at least the subset of the cells.

Clause 25: The method of any of clauses 20-24, wherein the user interface further comprises a code editor window via which a user may enter and/or revise the one or more blocks of programming instructions.

Clause 26: The method of any of clauses 20-25, wherein the user interface further comprises an execution window comprising a plurality of execution bars that may be reordered to define an order of execution of the code blocks.

Clause 27: A method comprising, by a processor of a computing device: (a) displaying a user interface comprising a spreadsheet containing a plurality of cells; (b) receiving, from a user via the user interface, a selection of a remote operation mode or a local operation mode. If the selection is for the remote operation mode, the method includes: (a) receiving, from a remote server for each of the plurality of cells, a corresponding value to display in that cell; and (b) displaying, in each of the plurality of cells, the corresponding value as received from the remote server without performing any function on the computing device to calculate the corresponding value. Otherwise, for at least some of the plurality of cells, the method includes executing a function to generate a corresponding value for those cells and displaying, in each of those cells, the corresponding value for that cell.

Clause 28: The method of clause 27, wherein the user interface displays a prompt that enables a user to select a programming language. When the user selects one of the cells when displayed on the local computing device, the user interface displays a function that is associated with the selected cell in the spreadsheet formula language that may reference functions or data in the selected programming language.

Clause 29: The method of clause 27 or 28 further comprising, by the remote server if the operation is for the remote operation mode, otherwise by the computing device: (a) identifying, from a plurality of candidate formula evaluator modules, a formula evaluator module that is associated with the selected programming language; (b) using the identified formula evaluator module to process the functions associated with the plurality of cells to generate, for at least a subset of the cells, a plurality of values; and (c) writing the plurality of values to a key-value store in association with keys that correspond to at least the subset of the cells.

Clause 30: The method of clause 29, further comprising, by the processor of the computing device, executing programming instructions that cause the computing device to display the user interface comprising the spreadsheet with the plurality of cells after the spreadsheet has been closed, and in response to receiving a command to open the spreadsheet. In this embodiment, the processor of the computing device also will use the identified formula evaluator module to retrieve, from the key-value store, values for at least the subset of the cells, The processor will cause the display to display, in the user interface, each retrieved value in a location of its associated cell.

Clause 31: The method of any of clauses 27-30, wherein the remote server is an endpoint that provides a communication path to a workbook node from which the active instance of the spreadsheet is served.

Clause 32: The method of any of clauses 27-30, further comprising: (a) receiving, via the user interface, a selected programming language from a plurality of candidate programming languages; and (b) displaying, in the user interface, functions associated with the cells in the spreadsheet formula language that reference functions or data in the selected programming language.

Clause 33: A computer program product comprising a computer-readable medium with instructions that are configured to cause a processor to: (a) display a user interface comprising a spreadsheet containing a plurality of cells; and (b) identify a remote server that contains an active instance of the spreadsheet by: (i) identifying a plurality of data centers that each contain or provide a gateway to at least one active instance of the spreadsheet, (ii) sending a message to each of the data centers, (iii) receiving, from at least some of the data centers, responses to the message, (iv) based on the responses, measuring message latency between the data centers from which responses were received and the computing device, and (v) selecting the data center having a lowest message latency as the remote server. The instructions will also cause the processor to, in response to receiving, from the remote server for each of the plurality of cells, a corresponding value to display in that cell, display, in each of the plurality of cells, the corresponding value as received from the remote server without the computing device performing any function to calculate the corresponding value.

Clause 34: The computer program product of clause 33 or 34, further comprising instructions to prompt a user to select a remote operation mode or a local operation mode. In this embodiment, the instructions to identify the remote server that contains the active instance of the spreadsheet comprise instructions to do so only in response to the user selecting the remote operation mode or not selecting the local operation mode. If the user selects the local operation mode, then for at least some of the plurality of cells, the instructions will cause the system to execute a function to generate a corresponding value for those cells and display, in each of those cells, the corresponding value for that cell.

Clause 35: The computer program product of clause 33 or 34, wherein the instructions to display the user interface user interface further comprise instructions to display a code editor window via which a user may enter and/or revise the one or more blocks of programming instructions.

Clause 36: The computer program product of any of clauses 33-35, wherein the instructions to display the user interface user interface further comprise instructions to display an execution window comprising a plurality of execution bars that may be reordered to define an order of execution of the code blocks.

Clause 37: A system comprising a processor; and a computer program product according to any embodiment of clauses 33-36.

Clause 38: The system of clause 37, further comprising the remote server.

Clause 39: The system of clause 37 or 38, wherein the remote server is an endpoint that provides a communication path to a workbook node from which the active instance of the spreadsheet is served.

Clause 40: A method of implementing a spreadsheet includes-,by a processor of a computing device: (a) generating and/or outputting a prompt that comprises a plurality of candidate programming languages; (b) receiving, in response to the prompt, a user selection of one of the candidate programming languages; and (c) displaying a user interface comprising a first interface area that displays one or more sheets of a spreadsheet, wherein each of the sheets comprises a plurality of cells, at least some of which comprise code in the spreadsheet formula language that references functions or data in the selected programming language.

Clause 41: The method of clause 40, further comprising: (a) identifying, from a plurality of candidate formula evaluator modules, a formula evaluator module that is associated with the selected programming language; (b) using the identified formula evaluator module to process functions associated with the plurality of cells to generate, for at least a subset of the cells, a plurality of values; and (c) writing the plurality of values to a key-value store.

Clause 42: The method of clause 41, wherein using the identified formula evaluator module to process functions associated with the plurality of cells to generate the plurality of values comprises (a) generating a first updated value for a first cell in the subset of cells, and (b) using the updated value to generate a second updated value for a second cells in the subset of cells. Also, in this embodiment writing the plurality of values to the key-value store comprises (a) writing the first updated value to the key-value store in association with a key of the first cell, and (b) writing the second updated value to the key-value store in association with a key of the second cell.

Clause 43: The method of clause 40, 41 or 42, further comprising, by the processor of the computing device, after the spreadsheet has been closed, in response to receiving a command to open the spreadsheet: (a) displaying the user interface comprising the spreadsheet with the plurality of cells; (b) using the identified formula evaluator module to retrieve, from the key-value store, values for at least the subset of the cells; and (c) displaying, in the user interface, each retrieved value in a location of its associated cell.

Clause 44: The method of any of clauses 41-43, wherein the user interface further comprises second interface area comprising a coding window corresponding to one or more blocks of programming instructions in the selected programming language. The programming instructions, when executed, will cause a computing device to update one or more of the variables used in at least some of the cells.

Clause 45: The method of clause 44, wherein the second interface area comprises a code editor window via which a user may enter and/or revise the one or more blocks of programming instructions.

Clause 46: The method of clause 44 or 45, wherein the second interface area comprises an execution window comprising a plurality of execution bars that may be reordered to define an order of execution of the code blocks.

Clause 47: computer program product comprising a memory device and programming instructions that are configured to cause one or more processors to implement a method of any of clauses 40-46.

Clause 48: A system comprising one or more processors, as well as a computer program product of any embodiment of clause 47.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A method of implementing a spreadsheet, the method comprising, by a processor of a computing device:

outputting a prompt that comprises a plurality of candidate programming languages;

receiving, in response to the prompt, a user selection of one of the candidate programming languages;

displaying a user interface comprising a first interface area that displays one or more sheets of a spreadsheet, wherein each of the sheets comprises a plurality of cells, at least some of which comprise code in a spreadsheet formula language that references functions or data in the selected programming language;

identifying, from a plurality of candidate formula evaluator modules, a formula evaluator module that is associated with the selected programming language;

using the identified formula evaluator module to process functions associated with the plurality of cells to generate, for at least a subset of the cells, a plurality of values; and writing the plurality of values to a key-value store, wherein:

using the identified formula evaluator module to process functions associated with the plurality of cells to generate the plurality of values comprises:

generating a first updated value for a first cell in the subset of cells, and using the first updated value to generate a second updated value for a second cells in the subset of cells; and writing the plurality of values to the key-value store comprises:

writing the first updated value to a key-value store in association with a key of the first cell, and writing the second updated value to the key-value store in association with a key of the second cell.

2. The method of claim 1 further comprising, by the processor of the computing device:

after the spreadsheet has been closed, in response to receiving a command to open the spreadsheet:

displaying the user interface comprising the spreadsheet with the plurality of cells, using the identified formula evaluator module to retrieve, from the key-value store, values for at least the subset of the cells, and displaying, in the user interface, each retrieved value in a location of its associated cell.

3. The method of claim 1, wherein;

the user interface further comprises a second interface area comprising a coding window corresponding to one or more blocks of programming instructions in the selected programming language, the programming instructions, when executed, will cause a computing device to update one or more variables used in at least some of the cells.

4. The method of claim 3, wherein the second interface area comprises a code editor window via which a user may enter and/or revise the one or more blocks of programming instructions.

5. The method of claim 3, wherein the second interface area comprises an execution window comprising a plurality of execution bars that may be reordered to define an order of execution of the one or more blocks of programming instructions.

6. A system, comprising:

a processor;

a display device; and a non-transitory computer-readable medium containing programming that are configured to cause the processor to:

generate a prompt that comprises a plurality of candidate programming languages, in response to receiving a user selection of one of the candidate programming languages based on the prompt, causing the display device to display a user interface comprising a first interface area that displays one or more sheets of a spreadsheet, wherein each of the sheets comprises a plurality of cells, at least some of which comprise code in a spreadsheet formula language that references functions or data in the selected programming language, identify, from a plurality of candidate formula evaluator modules, a formula evaluator module that is associated with the selected programming language, use the identified formula evaluator module to process functions associated with the plurality of cells to generate, for at least a subset of the cells, a plurality of values, and write the plurality of values to a key-value store, wherein:

the instructions to use the identified formula evaluator module to process functions associated with the plurality of cells to generate the plurality of values comprise instructions to:

generate a first updated value for a first cell in the subset of cells, and use the first updated value to generate a second updated value for a second cells in the subset of cells; and the instructions to write the plurality of values to the key-value store comprise instructions to:

write the first updated value to the key-value store in association with a key of the first cell, and write the second updated value to the key-value store in association with a key of the second cell.

7. The system of claim 6, further comprising additional programming instructions to, after the spreadsheet has been closed, in response to receiving a command to open the spreadsheet:

display the user interface comprising the spreadsheet with the plurality of cells;

use the identified formula evaluator module to retrieve, from the key-value store, values for at least the subset of the cells; and display, in the user interface, each retrieved value in a location of its associated cell.

8. The system of claim 6, wherein;

the user interface further comprises a second interface area comprising a coding window corresponding to one or more blocks of programming instructions in the selected programming language, and the programming instructions, when executed, will cause a computing device to update one or more variables used in at least some of the cells.

9. The system of claim 8, wherein the second interface area comprises a code editor window via which a user may enter and/or revise the one or more blocks of programming instructions.

10. The system of claim 8, wherein the second interface area comprises an execution window comprising a plurality of execution bars that may be reordered to define an order of execution of the code-one or more blocks of programming instructions.

11. A computer program product comprising a non-transitory computer-readable medium containing programming instructions that are configured to cause a processor to:

cause a computing device to output a prompt that comprises a plurality of candidate programming languages;

in response to receiving a user selection of one of the candidate programming languages based on the prompt, cause the computing device to display a user interface comprising a first interface area that displays one or more sheets of a spreadsheet, wherein each of the sheets comprises a plurality of cells, at least some of which comprise code in a spreadsheet formula language that references functions or data in the selected programming language;

identify, from a plurality of candidate formula evaluator modules, a formula evaluator module that is associated with the selected programming language;

use the identified formula evaluator module to process functions associated with the plurality of cells to generate, for at least a subset of the cells, a plurality of values; and write the plurality of values to a key-value store, wherein:

the instructions to use the identified formula evaluator module to process functions associated with the plurality of cells to generate the plurality of values comprise instructions to:

generate a first updated value for a first cell in the subset of cells, and use the first updated value to generate a second updated value for a second cells in the subset of cells, and the instructions to write the plurality of values to the key-value store comprise instructions to:

write the first updated value to the key-value store in association with a key of the first cell, and write the second updated value to the key-value store in association with a key of the second cell.

12. The computer program product of claim 11, wherein: the instructions to use the identified formula evaluator module to process functions associated with the plurality of cells to generate the plurality of values comprise instructions to:

generate a first updated value for a first cell in the subset of cells, and use the updated value to generate a second updated value for a second cells in the subset of cells; and the instructions to write the plurality of values to the key-value store comprises:

write the first updated value to the key-value store in association with a key of the first cell, and write the second updated value to the key-value store in association with a key of the second cell.

13. The computer program product of claim 11, further comprising additional programming instructions to, after the spreadsheet has been closed, in response to receiving a command to open the spreadsheet:

display the user interface comprising the spreadsheet with the plurality of cells;

use the identified formula evaluator module to retrieve, from the key-value store, values for at least the subset of the cells; and display, in the user interface, each retrieved value in a location of its associated cell.

14. The computer program product of claim 11, wherein: the user interface further comprises a second interface area comprising a coding window corresponding to one or more blocks of programming instructions in the selected programming language, and the programming instructions, when executed, will cause a computing device to update one or more variables used in at least some of the cells.

15. The computer program product of claim 14, wherein the second interface area comprises one or more of the following:

a code editor window via which a user may enter and/or revise the one or more blocks of programming instructions; or an execution window comprising a plurality of execution bars that may be reordered to define an order of execution of the code-one or more blocks of programming instructions.

16. A method of implementing a spreadsheet, the method comprising, by a processor of a computing device:

outputting a prompt that comprises a plurality of candidate programming languages;

receiving, in response to the prompt, a user selection of one of the candidate programming languages;

displaying a user interface comprising a first interface area that displays one or more sheets of a spreadsheet, wherein each of the sheets comprises a plurality of cells, at least some of which comprise code in a spreadsheet formula language that references functions or data in the selected programming language;

identifying, from a plurality of candidate formula evaluator modules, a formula evaluator module that is associated with the selected programming language;

using the identified formula evaluator module to process functions associated with the plurality of cells to generate, for at least a subset of the cells, a plurality of values;

writing the plurality of values to a key-value store; and after the spreadsheet has been closed, in response to receiving a command to open the spreadsheet:

displaying the user interface comprising the spreadsheet with the plurality of cells, using the identified formula evaluator module to retrieve, from the key-value store, values for at least the subset of the cells, and displaying, in the user interface, each retrieved value in a location of its associated cell.

17. The method of claim 16, wherein:

the user interface further comprises a second interface area comprising a coding window corresponding to one or more blocks of programming instructions in the selected programming language; and wherein the programming instructions, when executed, will cause a computing device to update one or more variables used in at least some of the cells.

18. The method of claim 17, wherein the second interface area comprises one or more of the following:

a code editor window via which a user may enter and/or revise the one or more blocks of programming instructions, or an execution window comprising a plurality of execution bars that may be reordered to define an order of execution of the one or more blocks of programming instructions.

19. A system comprising:

a processor;

a display device; and a non-transitory computer-readable medium containing programming instructions that are configured to cause the processor to:

generate a prompt that comprises a plurality of candidate programming languages, in response to receiving a user selection of one of the candidate programming languages based on the prompt, causing the display device to display a user interface comprising a first interface area that displays one or more sheets of a spreadsheet, wherein each of the sheets comprises a plurality of cells, at least some of which comprise code in a spreadsheet formula language that references functions or data in the selected programming language, identify, from a plurality of candidate formula evaluator modules, a formula evaluator module that is associated with the selected programming language, use the identified formula evaluator module to process functions associated with the plurality of cells to generate, for at least a subset of the cells, a plurality of values, write the plurality of values to a key-value store, and after the spreadsheet has been closed, in response to receiving a command to open the spreadsheet:

display the user interface comprising the spreadsheet with the plurality of cells;

use the identified formula evaluator module to retrieve, from the key-value store, values for at least the subset of the cells; and display, in the user interface, each retrieved value in a location of its associated cell.

20. The system of claim 19, wherein:

the user interface further comprises a second interface area comprising a coding window corresponding to one or more blocks of programming instructions in the selected programming language, and the programming instructions, when executed, will cause a computing device to update one or more variables used in at least some of the cells.

21. The system of claim 20, wherein the second interface area comprises one or more of the following:

a code editor window via which a user may enter and/or revise the one or more blocks of programming instructions; or an execution window comprising a plurality of execution bars that may be reordered to define an order of execution of the one or more blocks of programming instructions.

22. A computer program product comprising a non-transitory computer-readable medium containing programming instructions that are configured to cause a processor to:

cause a computing device to output a prompt that comprises a plurality of candidate programming languages;

in response to receiving a user selection of one of the candidate programming languages based on the prompt, cause the computing device to display a user interface comprising a first interface area that displays one or more sheets of a spreadsheet, wherein each of the sheets comprises a plurality of cells, at least some of which comprise code in a spreadsheet formula language that references functions or data in the selected programming language;

identify, from a plurality of candidate formula evaluator modules, a formula evaluator module that is associated with the selected programming language;

use the identified formula evaluator module to process functions associated with the plurality of cells to generate, for at least a subset of the cells, a plurality of values;

write the plurality of values to a key-value store; and after the spreadsheet has been closed, in response to receiving a command to open the spreadsheet:

display the user interface comprising the spreadsheet with the plurality of cells, use the identified formula evaluator module to retrieve, from the key-value store, values for at least the subset of the cells, and display, in the user interface, each retrieved value in a location of its associated cell.

23. The computer program product of claim 22, wherein:

the user interface further comprises a second interface area comprising a coding window corresponding to one or more blocks of programming instructions in the selected programming language, and the programming instructions, when executed, will cause a computing device to update one or more variables used in at least some of the cells.

24. The computer program product of claim 23, wherein the second interface area comprises one or more of the following:

a code editor window via which a user may enter and/or revise the one or more blocks of programming instructions; or an execution window comprising a plurality of execution bars that may be reordered to define an order of execution of the one or more blocks of programming instructions.

\* \* \* \* \*